United States Patent
Jesse et al.

(10) Patent No.: US 9,535,087 B2
(45) Date of Patent: *Jan. 3, 2017

(54) BAND EXCITATION METHOD APPLICABLE TO SCANNING PROBE MICROSCOPY

(71) Applicant: UT-Battelle, LLC, Oak Ridge, TN (US)

(72) Inventors: Stephen Jesse, Knoxville, TN (US); Sergei V. Kalinin, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,387

(22) Filed: Jun. 26, 2015

(65) Prior Publication Data

US 2015/0293144 A1 Oct. 15, 2015

Related U.S. Application Data

(62) Division of application No. 13/886,748, filed on May 3, 2013, now Pat. No. 9,097,738, which is a division of application No. 12/792,477, filed on Jun. 2, 2010, now Pat. No. 8,448,502, which is a division of application No. 11/515,348, filed on Sep. 1, 2006, now Pat. No. 7,775,086.

(51) Int. Cl.

| | |
|---|---|
| *G01Q 20/00* | (2010.01) |
| *G01Q 10/06* | (2010.01) |
| *G01Q 30/04* | (2010.01) |
| *G01Q 60/32* | (2010.01) |
| *B82Y 35/00* | (2011.01) |

(52) U.S. Cl.
CPC ............. *G01Q 20/00* (2013.01); *G01Q 10/06* (2013.01); *G01Q 30/04* (2013.01); *G01Q 60/32* (2013.01); *B82Y 35/00* (2013.01)

(58) Field of Classification Search
CPC ........ G01Q 10/06; G01Q 20/00; G01Q 30/04; G01Q 60/24; G01Q 60/32; B82Y 35/00
USPC ............... 73/105; 850/4, 5, 8, 10, 21, 33, 37
See application file for complete search history.

(56) References Cited

U.S. PATENT DOCUMENTS

| | | | | |
|---|---|---|---|---|
| 5,077,473 A * | 12/1991 | Elings | .................... | B82Y 35/00 250/307 |
| 5,267,471 A * | 12/1993 | Abraham | ............... | B82Y 35/00 250/307 |
| 5,553,487 A * | 9/1996 | Elings | .................... | B82Y 35/00 73/105 |
| 5,681,987 A * | 10/1997 | Gamble | ................. | B82Y 35/00 73/105 |
| 5,804,709 A * | 9/1998 | Bourgoin | ............... | B82Y 35/00 73/105 |
| 6,057,547 A * | 5/2000 | Park | ........................ | B82Y 35/00 850/10 |
| 6,085,580 A * | 7/2000 | Ludeke | ................... | B82Y 35/00 250/307 |
| 6,094,972 A * | 8/2000 | Yasutake | ................ | B82Y 35/00 73/105 |
| 6,145,374 A * | 11/2000 | Zypman Niechonski | ............... | B82Y 35/00 73/105 |
| 6,185,991 B1 * | 2/2001 | Hong | ..................... | B82Y 35/00 250/307 |
| 6,281,495 B1 * | 8/2001 | Kitamura | ............... | B82Y 35/00 250/307 |
| 6,499,340 B1 * | 12/2002 | Yasutake | ................ | B82Y 35/00 73/105 |
| 7,250,602 B2 * | 7/2007 | Matsumoto | ............ | G01O 60/34 250/306 |
| 7,404,313 B2 * | 7/2008 | Watanabe | ............... | B82Y 35/00 73/105 |
| 7,775,086 B2 * | 8/2010 | Jesse | ...................... | G01Q 10/06 73/105 |
| 8,448,502 B2 * | 5/2013 | Jesse | ...................... | G01Q 10/06 73/105 |
| 2005/0009197 A1 * | 1/2005 | Adams | ................... | G01O 70/08 436/164 |
| 2005/0262930 A1 * | 12/2005 | Shao | ...................... | B82Y 35/00 73/105 |

* cited by examiner

*Primary Examiner* — Daniel S Larkin
(74) *Attorney, Agent, or Firm* — Brinks Gilson & Lione

(57) ABSTRACT

Scanning probe microscopy may include a method for generating a band excitation (BE) signal and simultaneously exciting a probe at a plurality of frequencies within a predetermined frequency band based on the excitation signal. A response of the probe is measured across a subset of frequencies of the predetermined frequency band and the excitation signal is adjusted based on the measured response.

9 Claims, 12 Drawing Sheets

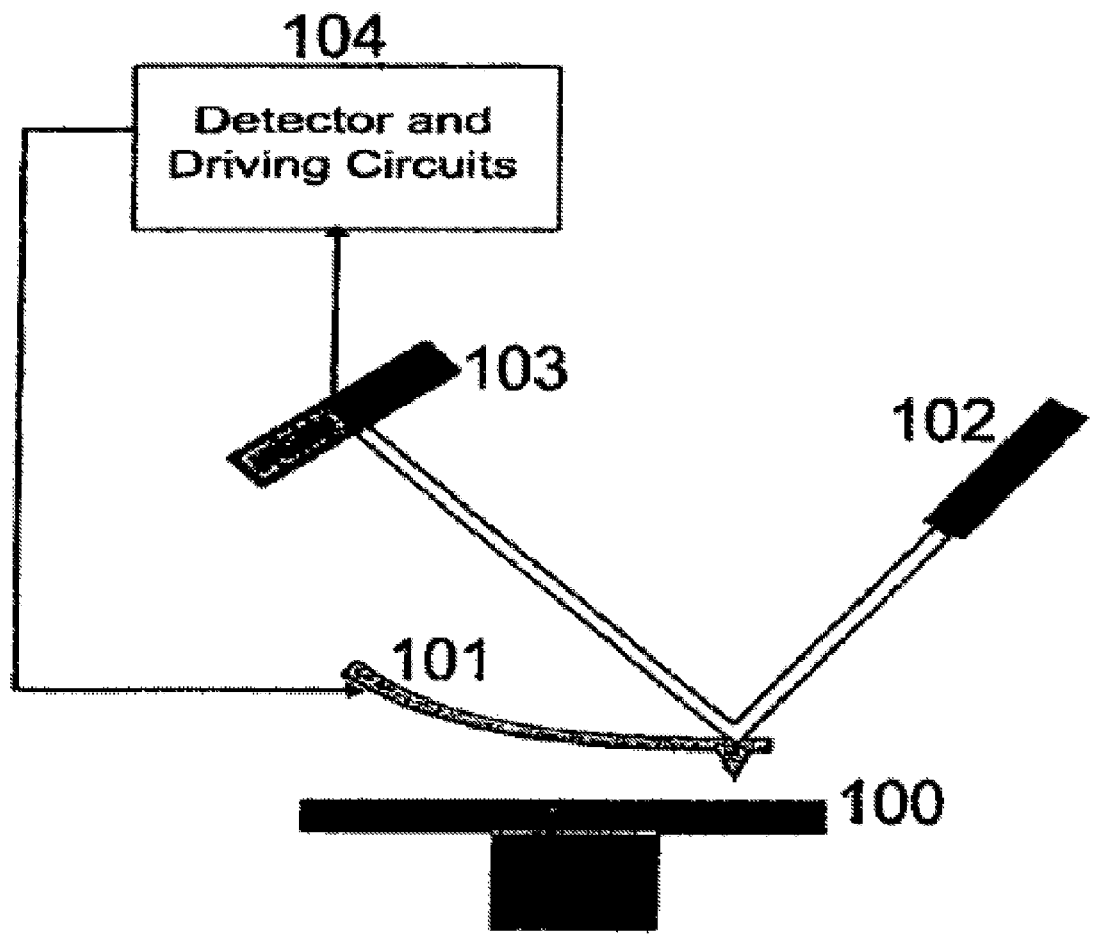
Fig. 1 - Prior Art

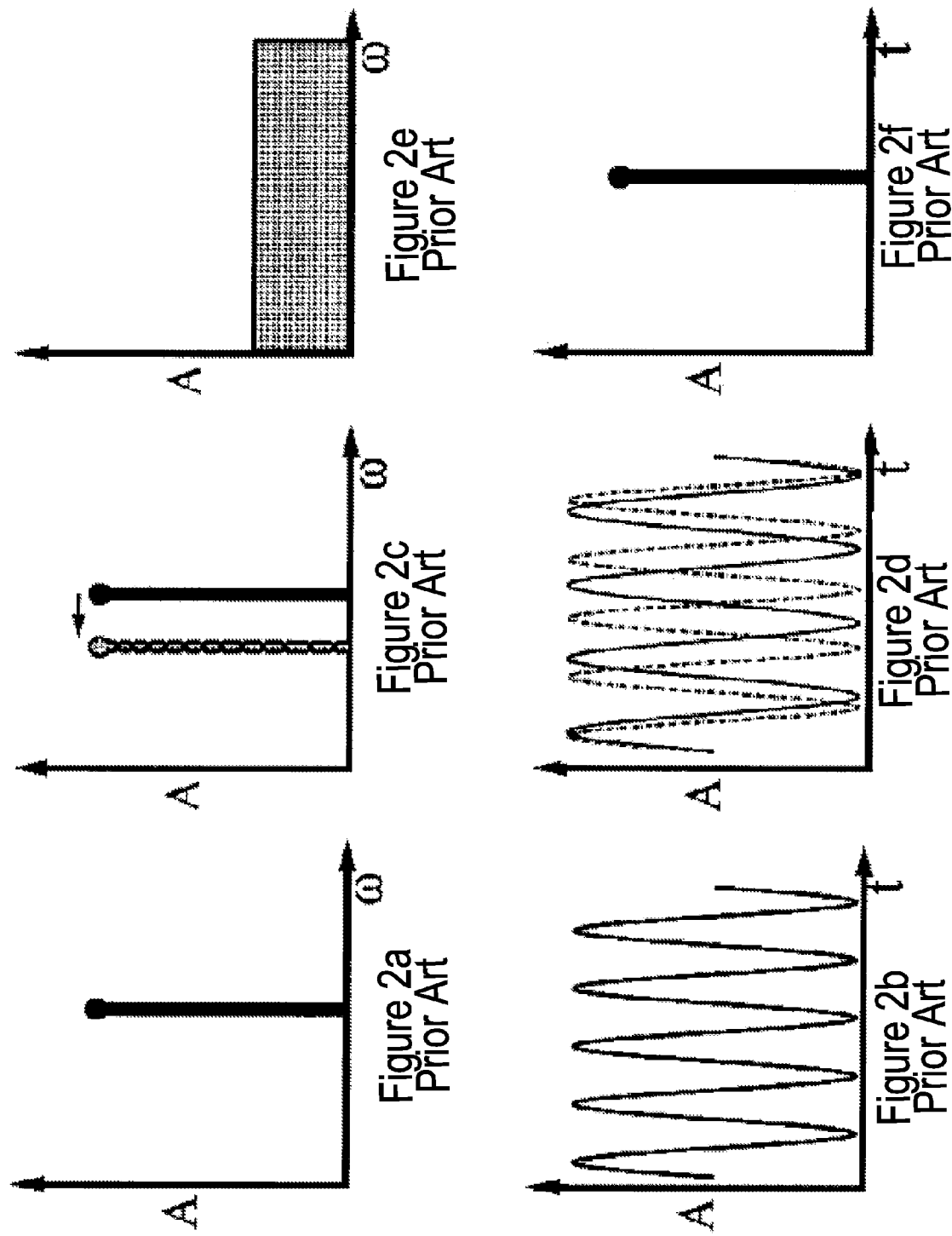

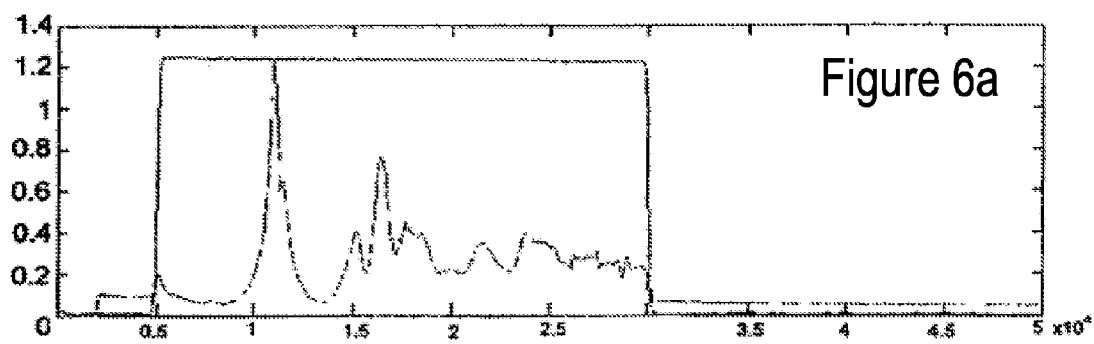
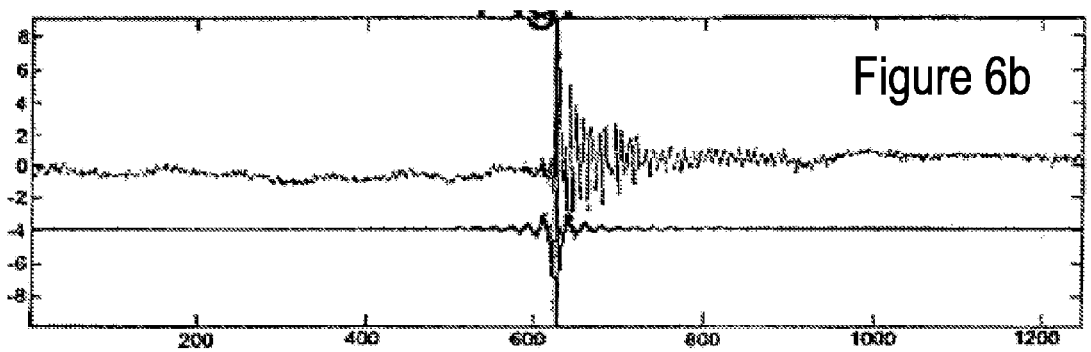
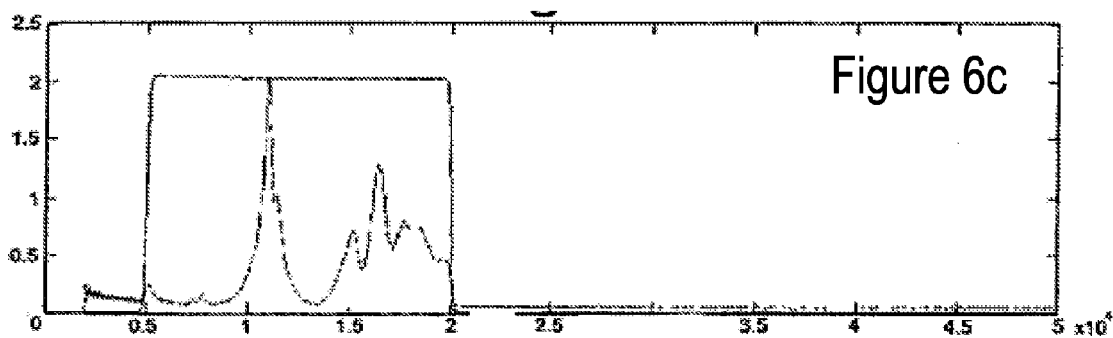
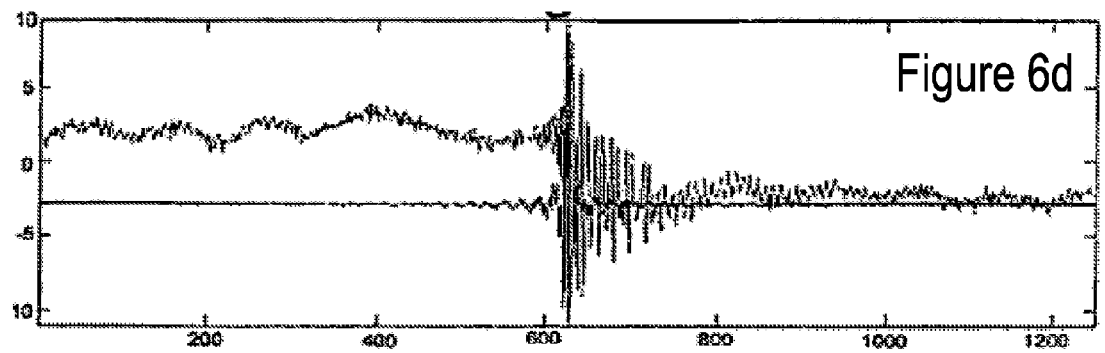

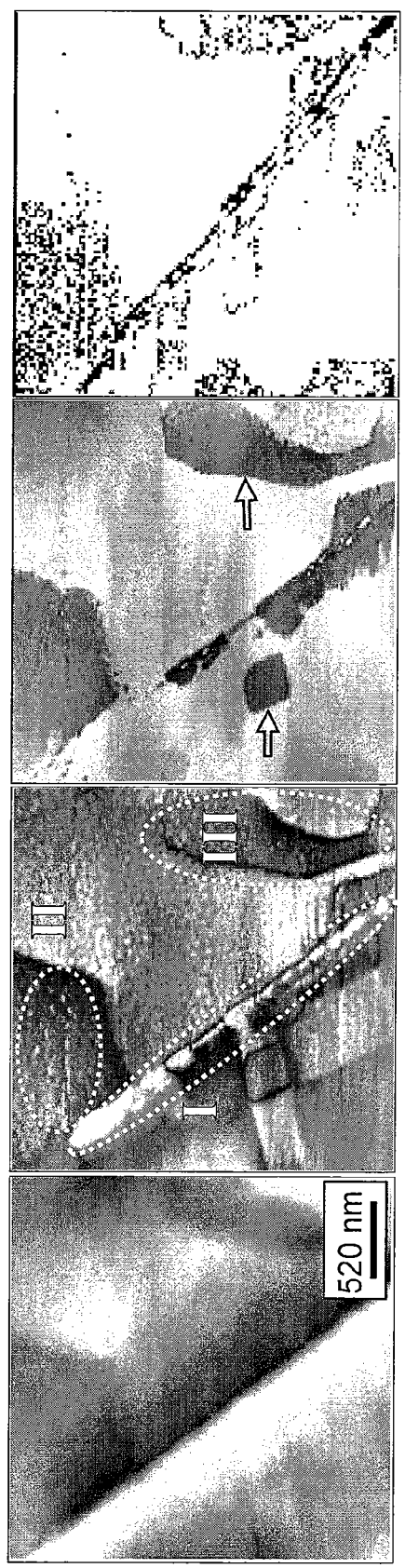
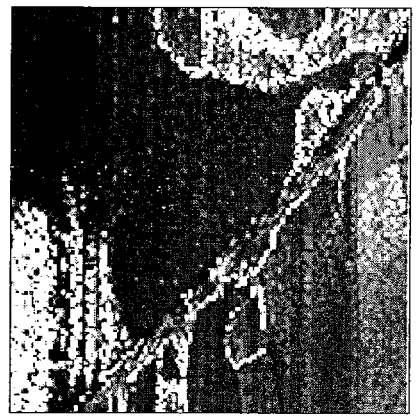
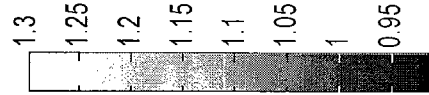
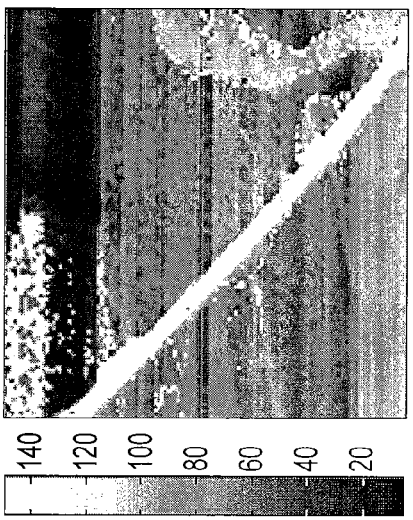
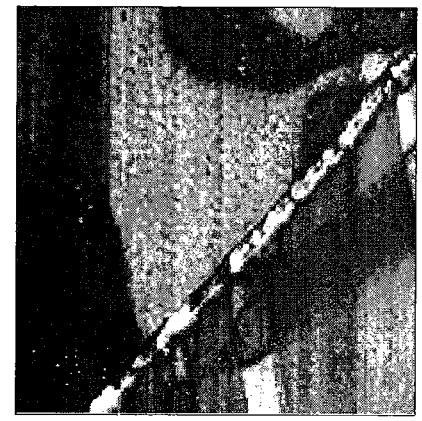
Fig. 9a Fig. 9b Fig. 9c Fig. 9d Fig. 9e Fig. 9f Fig. 9g

BAND EXCITATION METHOD APPLICABLE TO SCANNING PROBE MICROSCOPY

PRIORITY

This application is a divisional application of commonly-assigned U.S. patent application Ser. No. 13/886,748 filed May 3, 2013, now U.S. Pat. No. 9,097,738, which is a divisional application of commonly-assigned U.S. patent application Ser. No. 12/792,477 filed Jun. 2, 2010, now U.S. Pat. No. 8,448,502, which is a divisional application of commonly-assigned U.S. patent application Ser. No. 11/515,348 filed Sep. 1, 2006, now U.S. Pat. No. 7,775,086, issued Aug. 17, 2010, the entire contents of each are hereby incorporated by reference.

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-000R22725 to UT-Battelle, L.L.C. awarded by the Department of Energy. The Government has certain rights in this invention.

BACKGROUND INFORMATION

1. Field of the Invention

Embodiments of the invention relate generally to the field of measurement apparatus and methods. More particularly, embodiments of the invention relate to the apparatus and methods of scanning probe microscopy.

2. Discussion of the Related Art

Prior art scanning probe microscopy apparatus and methods are known to those skilled in the art. For instance, a conventional scanning probe microscope is shown in FIG. 1. A sample 100 is placed on a mount and a cantilever sensor 101 with a sharp tip is brought close to the sample surface. Interactions between the sample surface and the sensor tip lead to flexural and torsional deflections of the cantilever, the magnitude of which can vary from sub-nanometer to hundred nanometer range depending on operation mode. A laser 102 is deflected off the top of the cantilever into a detector 103, which is connected to driving circuitry 104. Other realizations of deflection sensors based on piezoresistive, piezoelectric, capacitive, MOSFET, tuning fork, double tuning fork, and other position sensors are well known. Current flowing through the cantilever or cantilever-surface capacitance can be other modes of detection. Typically, the sample surface is scanned point by point to obtain the topography or functional properties of the surface. Alternatively, the response is measured in a single point as a function of probe-surface separation, probe bias, etc., constituting spectroscopic modes of operation.

A problem with this technology has been that methods existing to date are generally based on the detection of the signal under a constant excitation or at a periodic excitation at a single frequency. In the constant or static mode, static tip deflection (or other static parameter such as tip-surface dc current) is used to serve as a feedback signal to maintain constant tip-surface separation or property measurement. In the periodic excitation mode, the amplitude or phase of cantilever oscillations or other oscillatory response is selected using lock-in amplifier or similar circuit and used as a feedback or detection signal. In the frequency tracking modes, the cantilever or other sensor is kept at a corresponding mechanical resonance, and changes in the dynamic characteristics of oscillation (e.g. resonant frequency or amplitude at the resonance) are detected and used as feedback or detected signals. All these modes severely limit the amount of information obtainable by the scanning probe microscope. Therefore, what is required is a solution that provides maximum information about the tip-surface interactions.

A number of SPM techniques (e.g. Force Volume Imaging, Pulsed Force Mode and Molecular Recognition Mode) are based on the specially designed large-amplitude waveforms that probe different parts of the force-distance curve to distinguish short- and long range interactions. These methods also have similar limitations, since either static force (force-distance measurements per se) or response at single frequency is measured at different positions of the probe tip with respect to the surface.

The fundamental problem with this technology has been that the resonance frequency, amplitude and quality factor (Q-factor) of the cantilever vibrating in contact with the surface under constant mechanical excitation, the three parameters that provide the complete description of the system in the simple-harmonic oscillator approximation, cannot be unambiguously separated. Therefore, what is also required is a solution that allows separation of these parameters.

One unsatisfactory approach, in an attempt to solve the above-discussed problems involves sweeping the excitation frequency at each sample point. However, a disadvantage of this approach is the significant time (1-10 s) per point, leading to unreasonable data acquisition times. A 100×100 pixel requires a time on the order of 10 s of hours.

Heretofore, the requirements of maximizing information about tip-surface interactions and obtaining (a) independent amplitude, resonant frequency and Q-factor parameters and (b) characterization of the complete behavior of the system referred to above have not been fully met. What is needed is a solution that solves all of these problems, preferably simultaneously.

SUMMARY OF THE INVENTION

There is a need for the following embodiments of the invention. Of course, the invention is not limited to these embodiments.

According to an embodiment of the invention, a process comprises: generation of the excitation signal having finite and predefined amplitude and phase spectrum in a given frequency band(s); using thus generated excitation signal to excite SPM probe in the vicinity of the sample surface electrically, optically, mechanically, magnetically, or otherwise; measuring the mechanical or other response of the probe in the predefined frequency range; analyzing the obtained data to extract relevant dynamic parameters of probe behavior such as quality factor, resonant frequency, or full amplitude-frequency and phase-frequency curve in a predefined range, that contain information on surface properties. In a static band excitation embodiment, the excitation signal is generated prior to imaging and is not changed from point to point. In an adaptive band excitation embodiment, the excitation signal is re-synthesized at each point to accommodate the changes in dynamic behavior of the probe in response to local surface properties, i.e. there is an active operational feedback.

According to another embodiment of the invention, a machine comprises: a probe; a shielded sample holder with a transducer or other excitation mechanism; a signal generation circuit coupled to the transducer; a detector coupled to the probe; and a signal analysis component that is capable of (a) fast determination of resonant frequency; a quality factor; and an amplitude, or (b) saving full amplitude/phase-frequency data set at each point.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

FIG. 1 is a view of a conventional a scanning probe microscope, appropriately labeled "PRIOR ART."

FIGS. 2a-2f show the characteristic excitation signals in the Fourier (top) and time (bottom) domains for a sinusoidal signal at signal frequency, in frequency tracking, and in pulse modes, constituting the state of the art in the field and appropriately labeled "PRIOR ART."

FIGS. 6a-6d show more band excitation plots of different widths and positions, representing embodiments of the invention.

FIGS. 9a-9g show resonance enhanced PFM images obtained by the method of the invention, representing an embodiment of the invention.

Figure 3A:
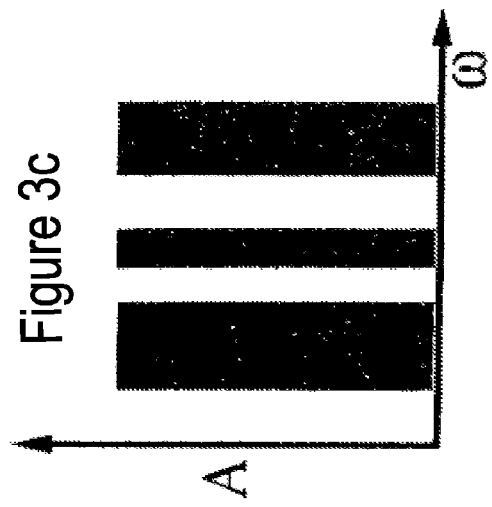
FIGS. 3a-3f show the frequency spectrums of examples of possible band excitation signals, representing embodiments of the invention.

DESCRIPTION OF PREFERRED
EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

This invention represents a novel approach for Scanning Probe Microscopy (SPM) based on the use of an excitation signal with controlled amplitude and phase density in the finite frequency range, distinguishing it from conventional approaches utilizing either excitation at a single frequency or spectroscopic measurements at each point. Similar band-excitation approaches can be used for other micro-electromechanical systems and cantilever-based sensor platforms having well-defined resonances or other well-defined regions of interest in response spectrum.

Scanning probe microscopy (SPM) methods existing to date are universally based on the detection of the signal under a constant (e.g. current in Scanning Tunneling Microscopy, cantilever deflection in contact mode Atomic Force Microscopy) or a periodic (e.g. amplitude in intermittent contact mode AFM or frequency shift in non-contact AFM) excitation. Generally, the sensitivity, resolution, non-invasiveness, and quantitativeness of SPM increases from constant to oscillatory to frequency-tracking regimes, mirroring the development of the field in the last two decades. In addition, a number of SPM techniques (e.g. Force Volume Imaging, Pulsed Force Mode and Molecular Recognition Mode) are based on the specially designed large-amplitude waveforms that probes different parts of force-distance curve to distinguish short- and long range interactions.

In the case of oscillatory SPM modes, the frequency of the excitation is either constant (amplitude or phase detection), or is adjusted using the appropriate feedback loop to maintain the system at the resonance. The signal at the selected frequency is measured using a lock-in amplifier or similar circuitry. In the variable frequency case, the frequency is tracked typically using phase locked loop (PLL) based circuitry. The amplitude of the modulation signal is either constant or is adjusted using an additional feedback loop to establish a constant response signal amplitude.

The aforementioned SPM modes, including static, constant excitation frequency and adjustable excitation frequency, now constitute the mainstay of the field and are incorporated in virtually all commercial or homebuilt SPM systems. However, we note that the oscillatory SPM modes to date are invariably limited to a single operational frequency (either zero for constant excitation, or selected frequency for oscillation). Hence, the measured response provides the information for system behavior only at the same frequency or its higher-order harmonics, limiting the amount of information obtainable by SPM. Methods based on the direct sampling of the force-distance curve also belong to this class, since either static force (force-distance measurements per se) or response at single frequency is measured at different positions of the probe tip with respect to the surface.

Here, we note that the approach based on single-frequency measurements is inherently limited in the amount of information on sample properties it can provide. As an example, in force-based SPMs the amplitude and quality factor (Q-factor) of the cantilever vibrating in contact with the surface under constant mechanical excitation (e.g. in atomic force acoustic microscopy, ultrasonic force microscopy, and force modulation imaging)[1] are two independent parameters containing the information on the mechanical losses and elastic properties of the tip-surface system, from which real and imaginary parts of local indentation modulus of the material can be obtained. Note however, that in the single frequency excitation scheme, these parameters can not be separated, and data analysis based on simple harmonic oscillator model includes approximations on the response at the resonance being inversely proportional to the Q-factor.[2]

As a second example, in the electromechanical SPMs technique, Piezoresponse Force Microscopy,[3] the response is strongly dependent both on the Q-factor and local electromechanical activity which vary independently across the surface. These two contributions can not be differentiated by measurements at single frequency. In addition, conventional PLL feedback loops have limited applicability due to phase changes between domains of opposite polarity, in which case the response phase can not serve as a reliable feedback signal.[4] As a result, this technique to date is limited to strongly piezoelectric materials, since traditional SPM approaches for resonance amplification of weak signal is inapplicable to PFM. Furthermore, no information on electromechanical losses in the system due to domain growth and nucleation, molecular reorientation, etc. can be obtained.

As a third example, in force-based SPMs the amplitude and quality factor (Q-factor) of the cantilever vibrating in the vicinity of the surface under mechanical excitation (e.g. in intermittent contact mode AFM and non contact AFM)[5] are two independent parameters containing information on the losses and elastic properties of the tip-surface system from which local properties on the sub-10 nanometer, molecular, and atomic levels can be obtained. However, in the single frequency excitation scheme (either using constant frequency, frequency tracking, or frequency tracking with adjustable driving signal), these parameters can not be separated, and complex data analysis methods based on the interpretation of both phase and frequency signals have been developed assuming the constant driving force.[6,7]

As a fourth example, response at the resonant frequency and losses of the electrically biased or magnetized tips provides information on local electrical dissipation (related to e.g. carrier concentration and mobility)8 or magnetic dissipation (related to magnetization dynamics).[9] However, the data acquisition and analysis in these cases is subject to same limitations as in examples.[1-3]

Specifically, in all the methods above, the information, e.g. amount of dissipated energy can be determined from the amplitude and phase at a fixed frequency in constant frequency methods, or from amplitude at resonant frequency in frequency tracking methods, if and only if the driving force acting on the system is constant. The typical example include position-independent mechanical driving on the cantilever using piezoactuator as embodied in intermittent contact AFM, phase AFM, or Atomic Force Acoustic Microscopy. In all cases when the driving force depends on electrostatic, magnetic, or electromechanical or other position-dependent forces, this is no longer the case. Moreover, this derivation relies on the oscillations being perfectly sinusoidal, i.e. no higher harmonics of excitation frequency should be generated.

Finally, in all SPM techniques operating under the conditions in which tip-surface interactions are non-linear, the amplitude-frequency and phase-frequency curves can differ significantly from the ideal harmonic oscillator or vibrating cantilever models, i.e. can include nonsymmetrical clipped main peaks, satellite peaks, etc. The shape of the response curve in the vicinity of resonance then contains information on the micromechanics and dynamics of tip-surface interactions. However, this information can not be deduced from measurements at a single frequency.

This limitation was realized by many researchers working in these fields, and a number of approaches based on the measurement of amplitude-frequency curves at each point of the image were suggested. The methods to achieve this goal include for example:

Sweeping the excitation frequency with subsequent lock-in detection of the signal. However, this approach requires significant time (~1-10 s) per point, since each frequency is sampled sequentially. This renders acquisition of a high resolution image impractical, since required times for 100× 100 pixel images exceed 10 s of hours.

Detection of the spectrum of thermal oscillation of cantilever or cantilever excited in the broad frequency band, by using spectrum analyzer or similar methods. In this case, the full spectrum in each point is obtained. However, this approach requires significant time at each point due to low signal levels, (since excitation is performed simultaneously at all frequencies), necessitating long acquisition times at each pixel. In addition, phase information is lost in these measurements.

Measuring the response to the step-function excitation and subsequent detection of the cantilever response.[10] In this case, the Fourier spectrum of excitation signal is constant, and this technique will also suffer from the limitations imposed by long acquisition times.

To summarize, in cases (a, b, c), the data acquisition at each point is extremely slow (>1 s), which renders imaging impractical. Moreover, data processing is time consuming, and thus response can not be used as a feedback signal for fast imaging. We recognize that the limitations of these methods discussed above are imposed by the choice of the region of the Fourier space of the system probed during measurements. Single frequency techniques excite and sample only at a single frequency. This allows fast imaging and high signal levels, but the information on the frequency-dependent response is lost. Spectroscopic techniques sample all Fourier space (as limited by the bandwidth of the electronics used). However, the response amplitude is small (since excitation is performed simultaneously at all frequencies), necessitating long acquisition times; alternatively, the frequencies are probed sequentially at each point, resulting in very long acquisition times The invention can include obtaining information on the phase and amplitude of the probe (e.g. cantilever) response not only at a single frequency, but also in the finite frequency region around the chosen frequency. As an example, mapping the amplitude- and phase-frequency behavior in the vicinity of the resonance allows to determine resonance frequency, quality factor, and amplitude independently. In a more general case, exact knowledge of amplitude- and phase-frequency behavior in the vicinity of the resonance provides a more complete description of the system in cases when single harmonic oscillator model is inapplicable due to non-linear interactions, et cetera. Furthermore, the invention can include the use of thus determined parameters as a feedback signal to optimize imaging conditions. We also note that of great practical interest are responses in selected regions of Fourier space; and the invention can include obtaining information on amplitude and phase behavior at resonances and in the vicinity of resonances, as opposed to either full spectrum, or response at a single or several (e.g. main signal and higher harmonics) selected frequencies.

Here, we propose the approach based on an adaptive digitally synthesized signal that excites multiple frequencies within selected frequency range (band of frequencies) simultaneously, avoiding the limitations of single excitation frequency (either constant or frequency-tracking) methods. We describe the principles, implementation, and possible applications.

Figure 3C:
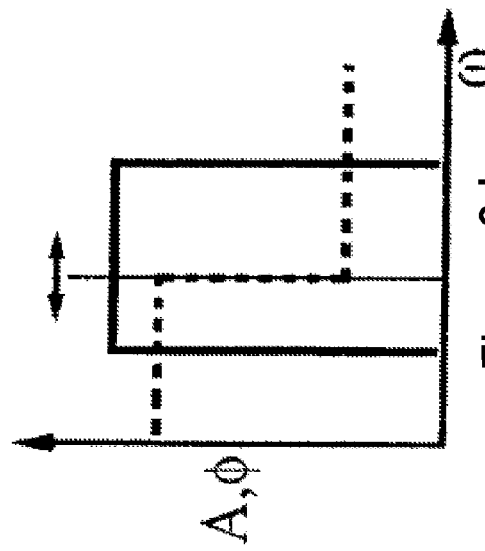
Figure 3B:
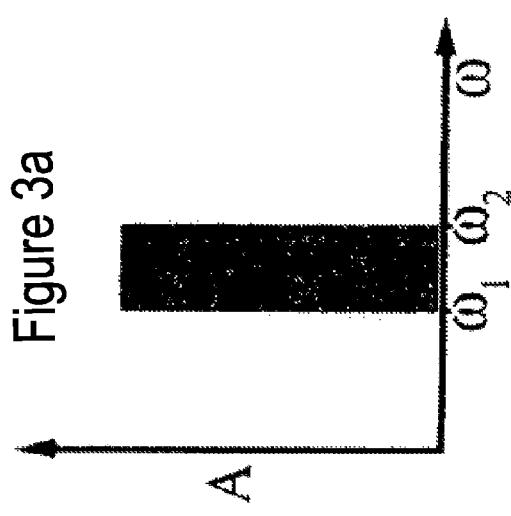
Figure 3D:
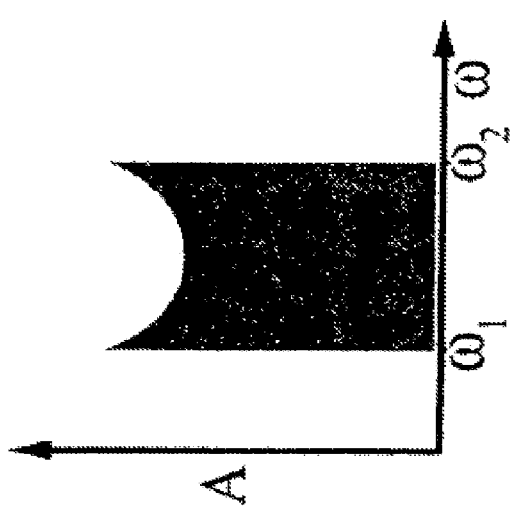
Figure 3E:
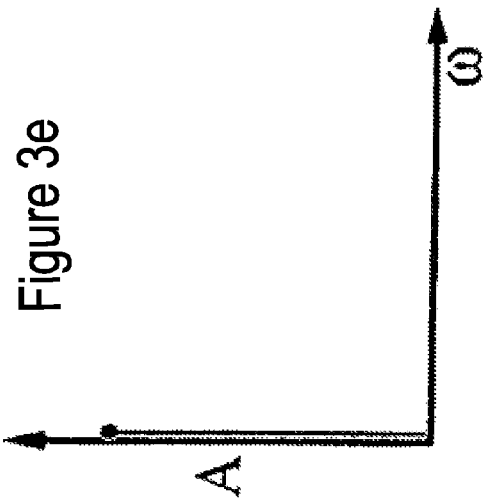
Figure 3F:
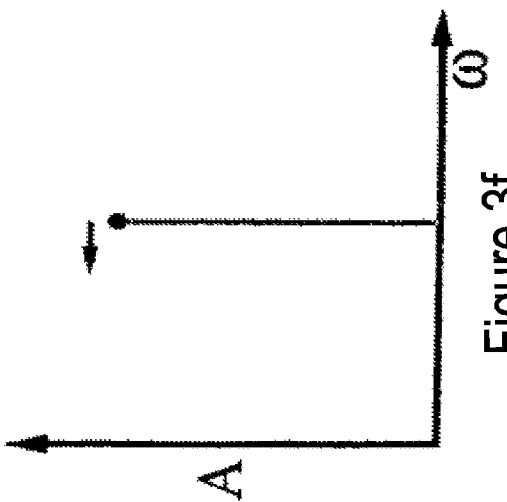

To determine the response of the cantilever in the selected frequency interval, e.g. in the vicinity of the resonance, the excitation signal having specified spectral density and phase content is defined. The traditional excitation signals are illustrated in FIGS. 2a-2f. The constant frequency is shown in FIGS. 2a,b, and the frequency-tracking is shown in FIGS. 2c,d, where feedback from the sample is measured and the frequency is adjusted to keep the tip at resonance. The pulse excitation is shown in FIGS. 2e-2f. Shown are signals both in Fourier and time domains. These excitation schemes constitute the state of the art. Possible examples of signals in the band-excitation method are illustrated in FIGS. 3a-3f and 4a-4e, where the response in the selected frequency window around the resonance is excited. In FIG. 3a, the excitation signal has a uniform spectral density. In FIG. 3b, the spectral density on the tails $\omega_1$, and $\omega_2$ of the resonance peak is increased to achieve better sampling. Thus the spectral density distribution of the resonant frequency band can take a parabolic shape. In FIG. 3c, several resonance windows are excited simultaneously. In FIG. 3d it is shown how the phase content of the signal can be controlled to, for example, achieve Q-control amplification. FIGS. 3e-3f illustrate two alternative signals. The excitation signal can be selected at the beginning of the imaging, or adapted at each point, so that the center of the excitation window follows the resonance frequency or the phase content is updated during the imaging.

Figure 4A:
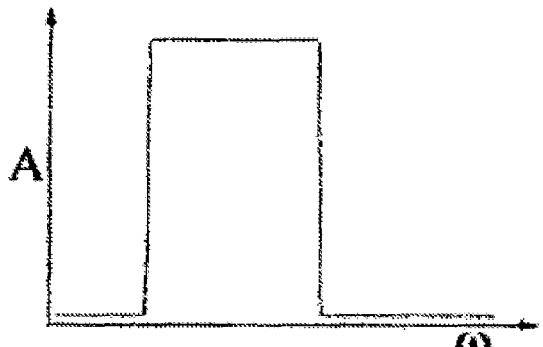
FIGS. 4a-4e show possible amplitude and phase distributions for band excitation signal in Fourier and time domains, representing embodiments of the invention.
Figure 4B:
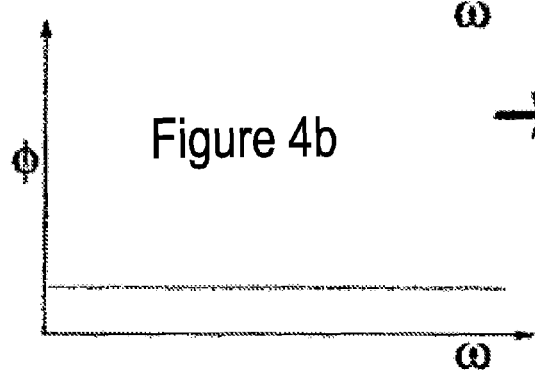
Figure 4C:
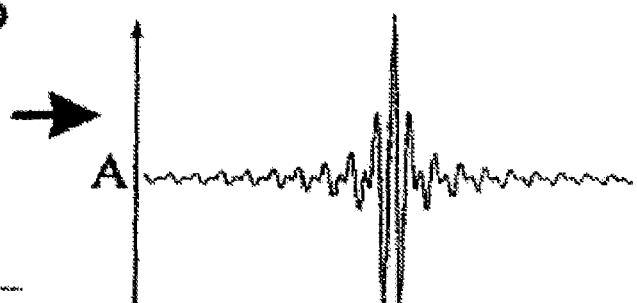
Figure 4D:
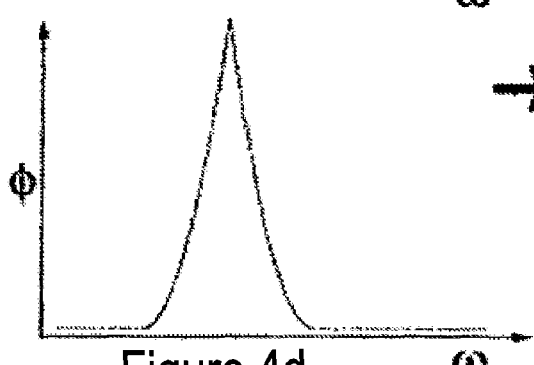
Figure 4E:
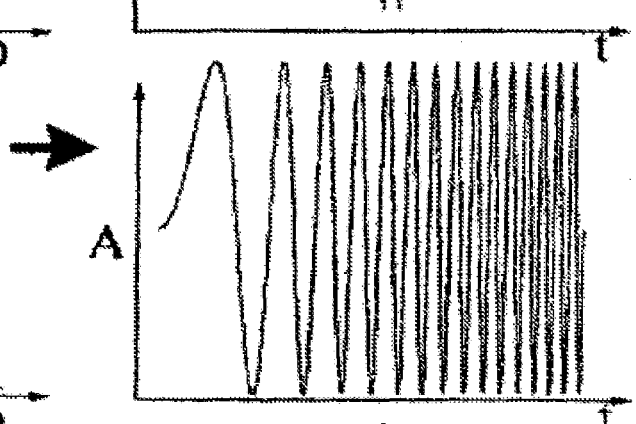

In FIGS. 4a-4e we illustrate the effect of the phase content on BE signal, including (FIG. 4a) a signal with constant amplitude in a given frequency range and (FIG. 4b) a signal with phase constant and (FIG. 4d) a signal with phase varied for optimal intensity. Also shown in FIGS. 4c and 4e are corresponding signals in time domain. Finally, the excitation waveform can be tailored in such a way as to provide an arbitrary system response (fully digital Q-control). In all cases, the excitation signal can be synthesized prior to scan and kept constant during imaging (static band excitation), or the excitation signal can be continuously changed in response to sample properties (adaptive band excitation) as described below.

Thus synthesized signal is used as an excitation signal in the SPM, where the possible excitation schemes mirror those in conventional SPM and include, but are not limited to existing techniques such as (a) mechanical excitation of the cantilever by the piezo actuator at the base of the tip, or integrated in the cantilever (b) similar schemes with two or more actuators for excitation of e.g. torsional cantilever oscillations (c) electrical excitation by the bias applied to the cantilever above the surface to detect electrostatic forces (d) electromechanical excitation by the bias applied to the cantilever in contact with the surface to detect local piezoelectric properties (e) vertical, lateral, or longitudinal oscillator placed below the sample (f) excitation by magnetic coil (g) excitation by modulated light beam (h) excitation by electric current flowing through the cantilever (i) alternative force sensors based on e.g. membranes[11,12]

Detected are the flexural and torsional responses of the cantilever, or equivalent displacement signals for alternative force sensors. The response signal from photodiode, interferometer, capacitive, piezoresistive, or any other position sensor is read by the fast SPM electronics and Fourier transformed to yield the frequency response of the system, i.e. amplitude and phase-frequency curves at each point. Alternatively, other integral transforms can be used to detect appropriate signal characteristics. Signal can be detected in the frequency window corresponding to the excitation signal, or broader/narrower window to e.g. detect second and higher order harmonic components of response.

The microscope operation in signal acquisition can be performed in a manner similar to force volume imaging, in which the tip approaches the surface, the response at a single point is detected, and the tip is shifted to second position while continuously scanning the surface in a spectroscopic mode, when the response is determined as a function of probe-surface separation similar to force-distance measurements, tip bias, or any other parameter or any combination thereof.

The 3D data array obtained as described above is analyzed to yield relevant parameters of cantilever behavior. In the harmonic oscillator approximation, these including the resonance frequency or frequencies, response at the resonance frequency or frequencies, and corresponding Q-factors. Alternatively, statistical characteristics insensitive to the model (e.g. statistical momentums of the amplitude-frequency response) or more complex analytical models can be used. Thus obtained parameters are stored as images and can be used as a feedback signal for microscope operation (static band excitation). Excitation signal can be synthesized in each point to accommodate the change in sample properties (adaptive band excitation) using feedback.

In the first approach, the band excitations signal is synthesized prior to the image acquisition and is not changed during the scanning. The response, i.e. the array of amplitude-frequency and phase-frequency data, is collected at each point and can be analyzed during image acquisition or afterwards. In the former case, the selected responses are stored as images, or used as feedback signals. The synthesized signal form is controlled to achieve e.g. the following specific features (not limiting):

(a) achieve better sampling of the tails of resonance peak by increasing the spectral density of input signal away from the resonance, (c) increase the effective Q-factor of the cantilever by selecting the phase content of excitation signal, (d) track several resonances simultaneously (e.g. for precision measurements of contact stiffness and local elastic properties)

(e) track several harmonics of a single resonance (e.g. for precision measurements of cantilever oscillations modes). The band over which the signal is collected and analyzed is not limited to the band of frequencies which was excited.

In the adaptive band excitation approach, the signal is analyzed at each point of the image (e.g. using field programmable gate array electronics) and obtained responses, including, but not limited to, resonant frequency, maximum response, and Q-factor, are either stored as images, or used as feedback signals. The modulation signal is then synthesized at each point to adjust for changes in local properties, e.g. shift in the resonant frequency. The possible implementations of the adaptive band excitation include, but are not limited to (a) increase signal level by narrowing the frequency window around the resonance in such a manner that the center of resonance window follows the resonant frequency of the cantilever (b) adapt the phase component of the signal to maximize the Q-factor, and hence the response, at each point.

Figure 12:
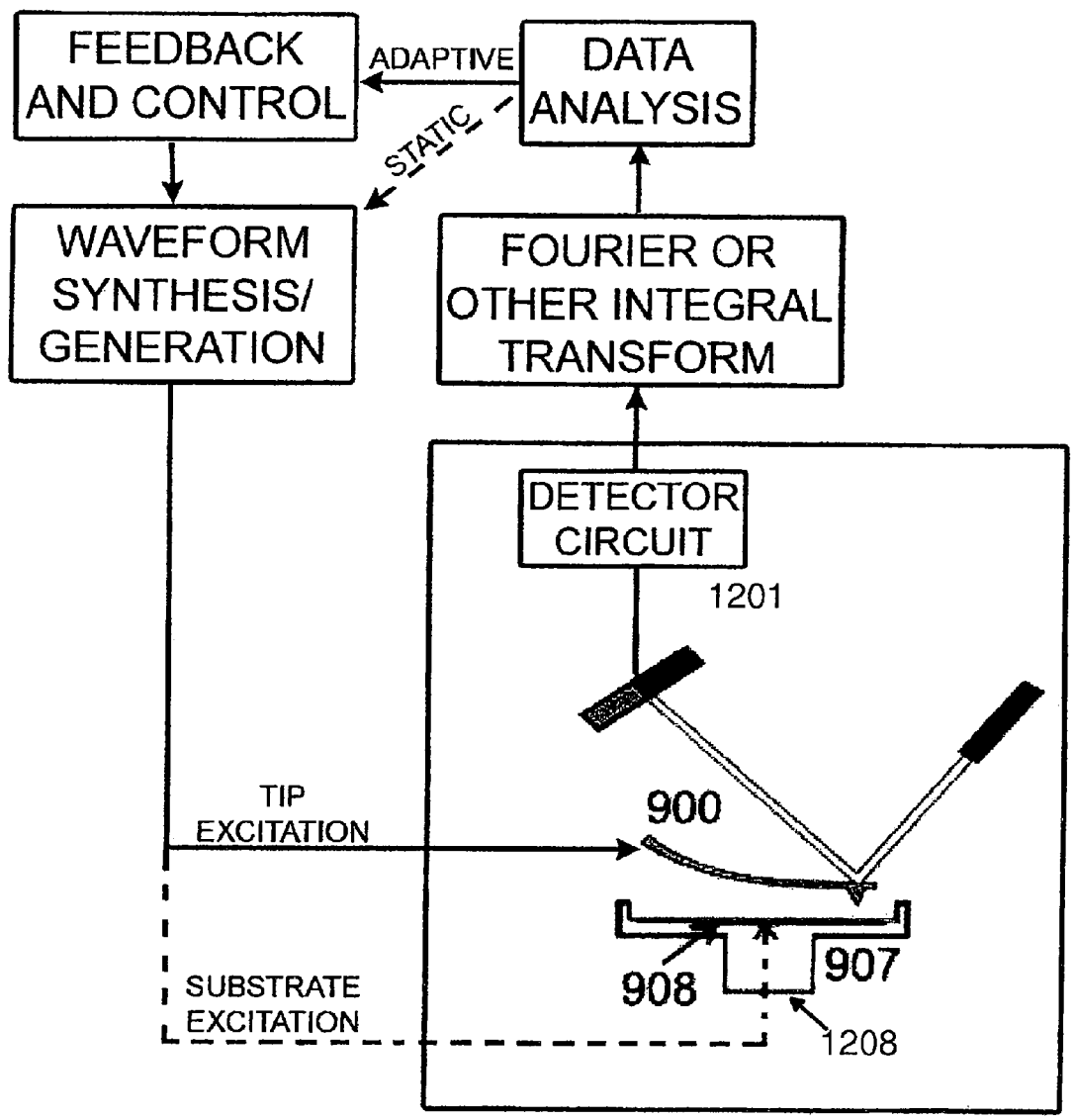
FIG. 12 shows an apparatus, representing an embodiment of the invention.

One possible embodiment of the apparatus of the invention is illustrated in FIG. 12. A cantilever 900 measures surface-tip interaction with a sample held in a sample holder 1208. A transducer 908 located within the sample holder and below the sample applies force to induce cantilever deflections. Alternatively, the transducer can be located at the cantilever base or incorporated in the cantilever. The type of transducer used depends on the applications, and can include, but not limited to, a piezo actuator, voltage bias generator, magnetic coil, heating element, or a coherent light generator. The band excitation signal generator circuit generates excitation waveform sent to the tip, actuator, or other driver. The detector circuit 1201 measures the time dependent deflections of the cantilever at each position of the cantilever as it scans across the sample surface. The analysis circuit analyzes the probe response, and using a certain analysis procedure, including, but not limited to Fourier transform, generates an amplitude-frequency and phase-frequency curves for each pixel of the sample surface. The amplitude frequency and phase-frequency curves can be analyzed in real time to extract resonant frequency, maximum amplitude, and Q factor in the simple harmonic oscillator approximation, set of relevant numerical parameters in alternative analytical models. The curves at each point can also be stored for subsequent analysis as a 30 data set. The relevant characteristics (e.g. a-factor, resonant frequency, etc) can be used as a feedback signal to update the generated waveform in each point of image or spectrum step. Possible implementations of signal generation and analysis circuits can include hardware, such as integrated circuits or field programmable gate arrays, or through software programs on a computer.

The invention can be utilized in contexts other than scanning probe microscopy. The invention can be utilized in the context of atomic force microscopy. The invention can be utilized in the context of frictional force microscopy. The band excitation method can be applied to other nanomechanical devices based on cantilevers or other forms of resonant mechanical, or electromechanical, or electrical detection. In particular, the BE approach can be used for cantilever-based chemical and biological sensors. In this case, changes in Q-factor and resonant frequency detected simultaneously by BE approach will provide information on the chemical changes in the functional layer on the cantilever, indicative on the presence of specific agent. Another embodiment of BE method will be the micromechanical resonator circuits based on silicon membranes or more complex elements. Finally, BE approach can be used for other types of SPM sensors, including recently developed membrane-based FIRAT and Delft sensors.

The detection and transformation of the real-time response of the cantilever produces an immense amount of data (millions of data points per pixel), as required by the Nyquist criterion (sampling rate should exceed twice the highest frequency component of the .signal. Hence, to probe dynamics at the MHz level, the sampling rate should be ~2 MHz, corresponding to ~1 Gb data array per standard 512×512 point image). It is of critical importance that this data be managed, analyzed, and distilled in such a way as to reduce it and extract only the relevant information (e.g., to around 10 parameters per pixel).

Fourier Transforms

The primary embodiment of the invention is based on the Fourier transform, specifically discrete Fourier transform, to reduce the data from real time to frequency domain, with additional analysis techniques to analyze the response in frequency domain. Due to linearity of Fourier transform, the ratio of the amplitude content of excitation and response signal gives the frequency dependence of the amplitude of the system response, and the difference between phase content of the response and excitation signal yields the frequency dependence of the phase of the system response in the predefined frequency interval.

Linear Transforms

A similar approach can be based on other linear and more complex integral transformations, including integral transforms of the kind $$F(y, t) = \int_{t}^{t+T} R(\tau)G(y(t-\tau))d\tau$$

$$F(\omega) = \int_{t}^{t+T} R(t)G(\omega, t)dt$$

Where R(t) is the time-dependent response signal of the cantilever, G(ω,t) is the kernel of the transform, and F(ω) is the frequency dependence of the response signal. For Fourier transform, the kernel is $G(\omega,t)=e^{-t a x}$ The ultimate goal of response analysis in scanning probe microscopy is to determine not only the frequency content of the response, but to associate that frequency information to a specific location. However, uncertainty principles dictate the inherent limitations that exist on the amount or quality of frequency information one can ascertain from a specific interval in time (or space in the case of scanning probe data).

There are several techniques developed within the framework of time-frequency and wavelet analysis that account for limitations posed by uncertainty and still provide useful information on the spatial variation of the response signal frequency content. In BE signal analysis it is necessary to convert the response signal of a single line-scan to a spectrogram or (a 2-D amplitude vs. frequency and space map) or similar 2-D map. Time-frequency and wavelet analysis provide the tools to construct these plots.

The most straight-forward time-frequency analysis technique is the 'windowed-' or 'short time-' Fourier transform. In this, a 'windowing' function, $H(\tau-t)$, restricts the frequency analysis to a specified interval of time (space)

$$F(\omega, t) = \int_t^{t+T} R(\tau) G(\omega, \tau) H(\tau - t) d\tau$$

$$G(\omega, \tau) = e^{-i\omega\tau}$$

In the standard Fourier transform $H(t-\tau)$ is 1. The simplest window is the rectangle function. Slightly more complex windows might include the Gaussian, Hann, or Hamming windows. Additional variability can be introduced to the windowing function to control, for instance, its width so that $$H(\alpha, \tau-1)$$

Wavelet Transforms

A subset of time-frequency analysis is wavelet analysis, in which a takes on a specific role in the widowing function as the dilation parameter $$H(a, \tau - t) = H\left(\frac{\tau - t}{a}\right)$$

$$W(a, t) = \int_t^{t+T} R(\tau) H\left(\frac{\tau - t}{a}\right) d\tau$$

There are several commonly recognized and well-studied wavelet functions: Mexican hat or mother wavelet (pg. 6, eq. 2.1, P. S. Addison, 2002)
Morlet wavelet (pg. 35, eq. 2.37, Addison)
Haar wavelet (pg. 73, eq. 3.32, Addison)
The Daubechies family of wavelets (pg 79, eq. 3.47, pg. 104,-116 Addison)

Windowing functions and/or wavelets can be specially tuned to detect specific events within the response signal. This makes them particularly valuable in scanning probe signal analysis in searching for particular vibration signatures that would indicate the presence or absence of an event of interest (e.g. molecular binding, quaziparticle emission, etc).

Other integral transforms:

Other integral transforms can be used as well to generate spectrogram-like maps. Most notably the Wigner transform.

$$F(\omega, t) = \int_t^{t+T} R\left(t - \frac{1}{2}\tau\right) R\left(t + \frac{1}{2}\tau\right) G(\omega, \tau) d\tau$$

$$G(\omega, \tau) = e^{-i\omega\tau}$$

A general classification of integral transforms discussed above is as follows (from pg. 136, time-frequency analysis, L. Cohen, 1995).

$$F(\omega, t) = \int \int \int s^*\left(u - \frac{1}{2}\tau\right) \cdot s\left(u + \frac{1}{2}\tau\right) \cdot G(\omega, \tau) \cdot e^{i\theta t - i\tau\omega + i\theta u} du\, d\tau\, d\theta$$

Where s and s* are the response signal and the complex conjugate of the response signal, respectively, and $G(\omega,\tau)$ is the kernel. Under this classification scheme, the kernel for the Wigner transform is 1. The kernel for the windowed Fourier transform is $$G(\omega, \tau) = \int H^*\left(u - \frac{1}{2}\tau\right) \cdot e^{i\theta t} \cdot H\left(u + \frac{1}{2}\tau\right) du$$

Other kernels include:
Margenau-Hill, $\cos(\frac{1}{2}\theta\tau)$
Kirkwood-Rihaczek, $e^{i\theta\tau/2}$
Born-Jordan (sin c), $\sin(a\theta\tau)/a\theta\tau$
Page, $e^{i\theta|\tau|}$
Choi-Williams, $e^{-\theta^2\tau^2/\sigma}$ Other transform procedures which are particularly useful for improving the frequency resolution over a specific frequency range of discrete signals include the Chirp Fourier Transform (pg. 151, A course in Digital Signal Processing, B. Porat, 1997) and the Zoom FFT (pg. 153, A course in Digital Signal Processing, B. Porat, 1997).

Other forms of data analysis may include analysis of time series at each point to extract (e.g. Lyapunov) exponents from chaotic data. Other forms of data analysis may also include single event statistical analysis (e.g. density of events, etc).

The invention can include other forms of analysis. The measured cantilever response either in time domain, Fourier domain, and phase space of other integral transform can be fitted to a specific model to reduce the data array to a small number model-specific parameters. One embodiment of the invention includes fit to the simple harmonic oscillator model Eq. (1), where resonant frequency, maximum response, and Q-factor provide complete description of the system dynamics.

The other form of analysis include fitting to the solution of beam equation or any other linear differential equation describing probe dynamics, for which the solution can be represented as a linear superposition of partial solutions with coefficients dependent on local properties. As an example, in a specific case of the cantilever vibrating under the effect of local and distributed electrostatic forces and surface displacement in Piezoresponse force microscopy, the cantilever dynamics in the absence of damping is given by $$\frac{d^4}{dx^4} + \frac{\rho S_c}{EI}\frac{d^2 u}{dt^2} = \frac{q(x, t)}{EI}$$

where E is the Young's modulus of cantilever material, I is the moment of inertia of the cross-section, $\rho$ is density, $S_c$ is cross-section area, and q(x,t) is the distributed force acting on the cantilever. For a rectangular cantilever $S_c$=wh and I=$wh^3/12$, where w is the cantilever width and h is thickness. The cantilever spring constant, k, is related to the geometric parameters of the cantilever by k=$3EI/L^3$=$Ewh^3/4L^3$. In beam-deflection AFM, the deflection angle of the cantilever, θ, is measured by the deflection of the laser beam at x=L, and is related to the local slope as θ=arctan (u'(L))≈u'(L). For a purely vertical displacement, the relationship between cantilever deflection angle and measured height is A=2θL/3. This equation provides the relationship between cantilever deflection induced by longitudinal or electrostatic interactions and detected vertical PFM signal.

Eq. (1) is solved in the frequency domain by introducing $u(x,t)=u_0(x)e^{i\omega t}$, $q(x,t)=q_0 e^{i\omega t}$, where $u_0$ is the displacement amplitude, $q_o$ is a uniform load per unit length, t is time, and ω is modulation frequency. After substitution, Eq. (1) is:

$$\frac{d^4 u_0}{d^4} = \kappa^4 u_0 + \frac{q_0}{EI}, \quad (2)$$

where $\kappa^4=\omega^2 \rho S_c/EI$ is the wave vector. On the clamped end of the cantilever, the displacement and deflection angle are zero, yielding the boundary conditions $$u_0(0)=0 \text{ and } u_0(0)=0, \quad (3a,b)$$

On the supported end, in the limit of linear elastic contact the boundary conditions for moment and shear force are $$EIu_0''(L)=k_2 H(d_2-u_0'(L)H) \text{ and } EIu_0'''(L)=-f_0+k_1(u_0(L)-d_1) \quad (4a,b)$$

where $f_0$ is the first harmonic of the local force acting on the tip. For non-piezoelectric materials, $d_1=d_2=0$, while for zero electrostatic force, $f_0=0$, providing purely electromechanical and electrostatic limiting cases for Eq. (4).

After solving the linear Eq. (2) and using $EI=kL^3/3$, the deflection angle is $$\theta(\beta) = \frac{A_v(\beta)d_1 + A_l(\beta)d_2 + A_e(\beta)f_0 + A_q(\beta)q_0}{N(\beta)} \quad (5)$$

where $$A_v(\beta)=3\beta^4 k_1 kL \sin\beta \sin h\beta \quad (6)$$

$$A_l(\beta)=3\beta^2 Hk_2(3k_1+\cos h\beta(-3k_1 \cos\beta+\beta^3 k \sin\beta)+\beta^3 k \cos\beta \sin h\beta) \quad (7)$$

$$A_e(\beta)=3\beta^4 kL \sin\beta \sin h\beta \quad (8)$$

$$A_q(\beta)=3L^2(3k_1(\cos h\beta-\cos h\beta)-k\beta^3 \sin\beta+(k\beta^3+3k_1)\sin\beta)\sin h\beta) \quad (9)$$

$$N(\beta)=\beta^2(9H^2 k_1 k_2+\beta^4 k^2 L^2+\cos h\beta((-9H^2 k_1 k_2+\beta^4 k^2 L^2)\cos\beta++3\beta k(k_1 L^2+H^2 k_2 \beta^2)\sin\beta)+3\beta k(-k_1 L^2+H^2 k_2 \beta^2 \cos\beta \sin h\beta) \quad (10)$$

and the dimensionless wave number is β=κL. In this specific case, fitting of the cantilever response allows determination of vertical piezoelectric coefficient, $d_1$, longitudinal piezoelectric coefficient, $d_2$, local electrostatic force, $f_o$, and distributed electrostatic force, q, at each point. Similar approaches can be applied to more complex differential equations containing intrinsic and tip-surface damping terms, etcetera. Still more complex forms of analysis include linear differential equations with distance-dependent forces including both conservative and dissipative components, for which solutions can be found for a small number explicitly or parametrically defined model specific parameters.

The invention can include the use of characterization data to control the band excitation signal. The model specific parameters describing system dynamics can be recorded as SPM images or be used as an input to modify the excitation signal. The simplest form of such modification include changing the frequency interval (the position of each edge of the band). Other possible forms include:

vary phase content position of the phase cross-over as in a-control combine (add, subtract, multiply) the response signal to excitation signal to artificially either increase or decrease the effective Q-factor of the system vary amplitude density to achieve optimal sampling of region of interest The signal can be used as a feedback for updating the waveform for property measurements, or for topographic imaging.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred mode(s) for the practice of the embodiments of the invention. However, it should be appreciated that many changes can be made in the exemplary embodiments which are disclosed while still obtaining like or similar result without departing from the spirit and scope of an embodiment of the invention. Accordingly, the examples should not be construed as limiting the scope of the invention.

Example 1

Band Excitation in Time and Frequency Plots

Example 1 illustrates the concept of a static band excitation applied to a piezo-actuator with response spectrum. Excitation waveform for excitation bands of different widths and positions and response spectra for these different waveforms are shown.

Figure 5A:
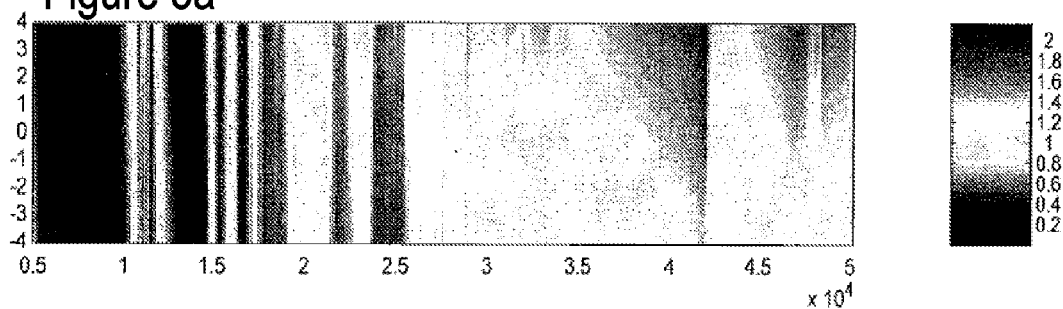
FIGS. 5a-5d show further example of band excitation plots in time and frequency domains, representing embodiments of the invention.
Figure 5B:
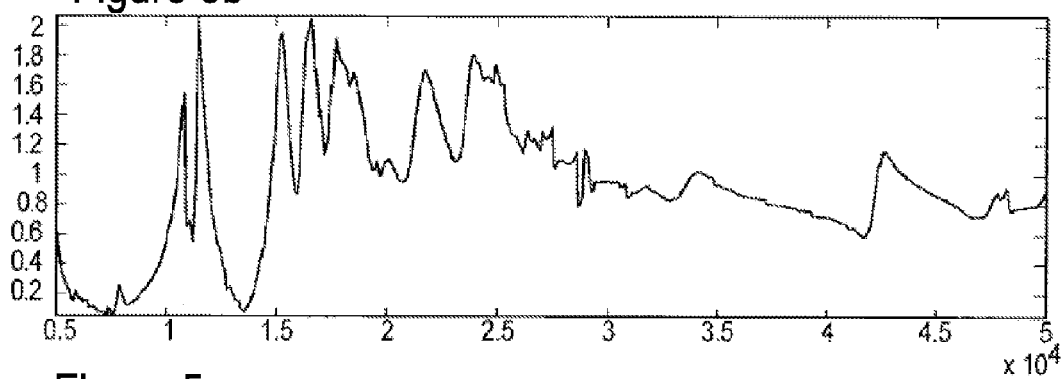

This method differs from the method using lock-in and sweeps in that a single complex waveform is used to excite a continuous band of frequencies instead of just driving the system with a single frequency. The results in FIG. 5a were recorded using lock-in/sweep method and represent the amplitude of cantilever response as a function of dc tip bias and excitation frequency. The oscillations are induced by the piezoelectric actuator placed below the tip. The FIG. 5b shows the spectral amplitude response for a tip bias of 0 V. The frequency range is from 5000 Hz to 50,000 Hz. The tip used in these tests has a resonant frequency of 12 kHz according to the manufacturer. The acquisition time for data in FIGS. 5a-5b are ~30 min (~1 s/frequency) and are limited by the time required for the lock-in amplifier to switch to a different frequency.

Figure 5C:
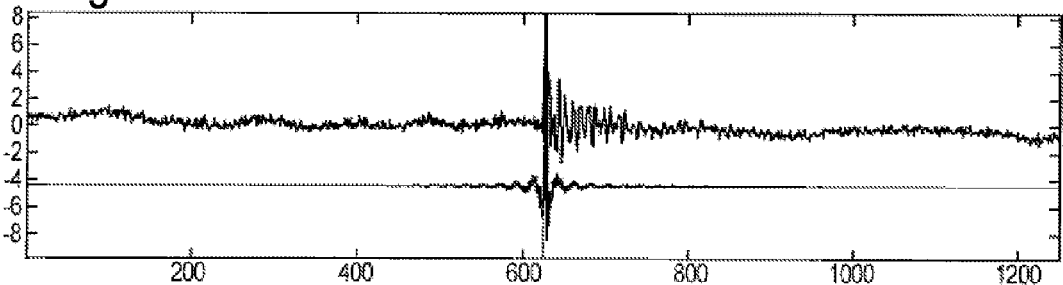

Illustrated in FIG. 5c are the results from the band excitation approach. FIG. 5c shows the variation in amplitude as a function of time. The x-axis is in units of microseconds. So the duration of the plot is approximately 1/80$^{th}$ of a second. The bottom line is the specially chosen input function used to drive the piezo actuator. The top line is the vertical response of the tip as measured by the optical detector. No noise filtering system was used in any of these experiments. Note: the y-axis scale is not the same for the two data sets. These data were captured simultaneously using the data acquisition system running at 100 ksamples/sec for each channel.

Figure 5D:
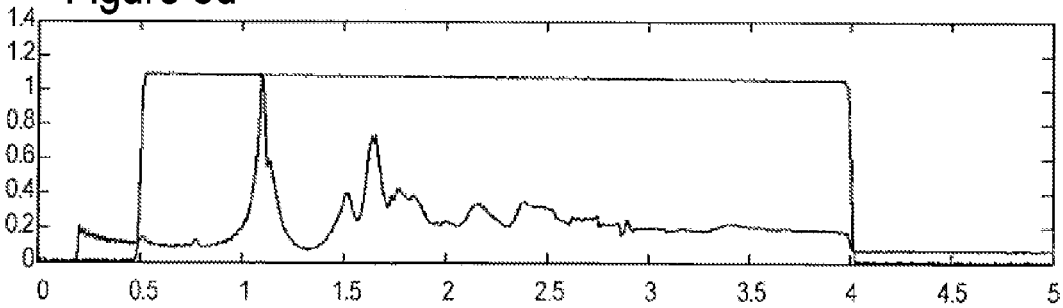

FIG. 5d shows a plot of the Fourier transform of each of the signals above. The square spectrum shows the band of driving frequencies which, for this experiment, was chosen to span from 5 kHz to 40 kHz. The lower line is the response spectrum of the piezo/tip system. Comparison of this plot with the results from the lock-in shown in FIGS. 3a-3b reveals some similarities and some differences. Many of the peaks are located at the same frequencies and many of the interesting features are the same in each image. However, the relative intensities of the features are different. This discrepancy is probably due to non-linearities in the cantilever response, when higher-order harmonics contribute to the signal.

The plots in FIGS. 6a-6f show results from using excitations bands of different widths and positions. FIGS. 6b, 6d, and 6f show the amplitude plots and FIGS. 6a, 6c, and 6e the corresponding Fourier transforms. As expected, there is almost no measurable response outside the excitation window. In this experiment we have excited just the bands around the resonant frequency. Note that the response curves do not change appreciably on the narrowing of the frequency window.

Example 2

BE-PFM

Example 2 details the application of the static band excitation principle for piezoresponse force microscopy. In this example, the band-excitation method is used to perform resonance-enhanced Piezoresponse Force Microscopy.

Piezoresponse Force Microscopy and spectroscopy of domain and switching dynamics at small excitation voltages requires resonance enhancement of small surface displacements. The contact stiffness depends strongly on local elastic properties and topography, resulting in significant variations of the resonant frequency. Moreover, electromechanical response at the resonance is determined both by the local Q-factor and electromechanical activity. Here we develop an approach for resonance-enhanced PFM that allows mapping of the local electromechanical activity, contact stiffness, and loss factor, thus avoiding limitations inherent to conventional frequency-tracking. We anticipate that resonance-enhanced PFM will be important for imaging weakly piezoelectric materials and probing inelastic phenomena in ferroelectrics.

Figure 7B:
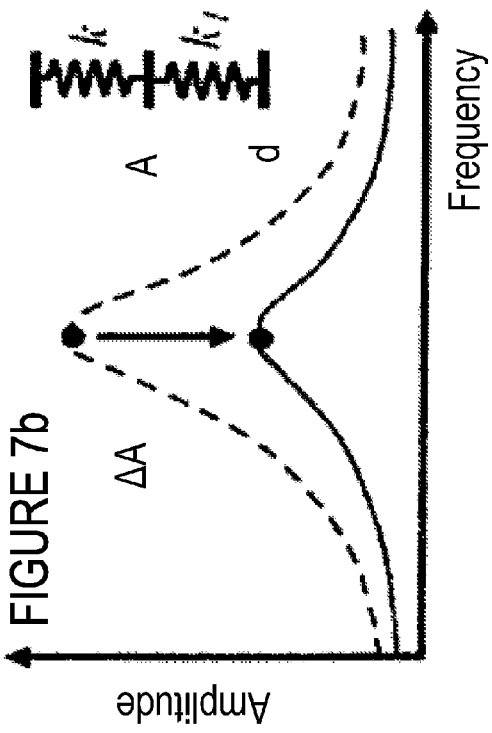
FIGS. 7a-7d show the effect of surface topography on contact stiffness and as well as amplitude-frequency curves, representing an embodiment of the invention as applied to Piezoresponse Force Microscopy.
Figure 7D:
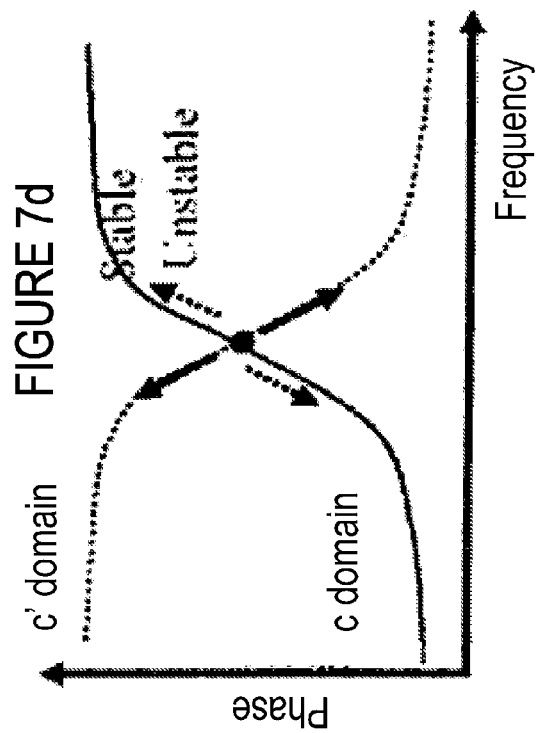
Figure 7A:
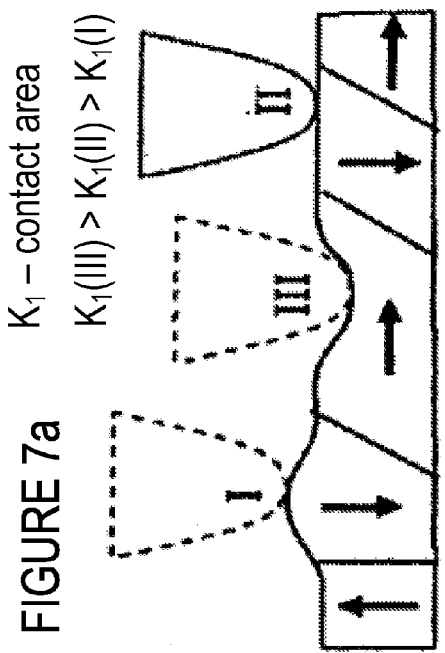
Figure 7C:
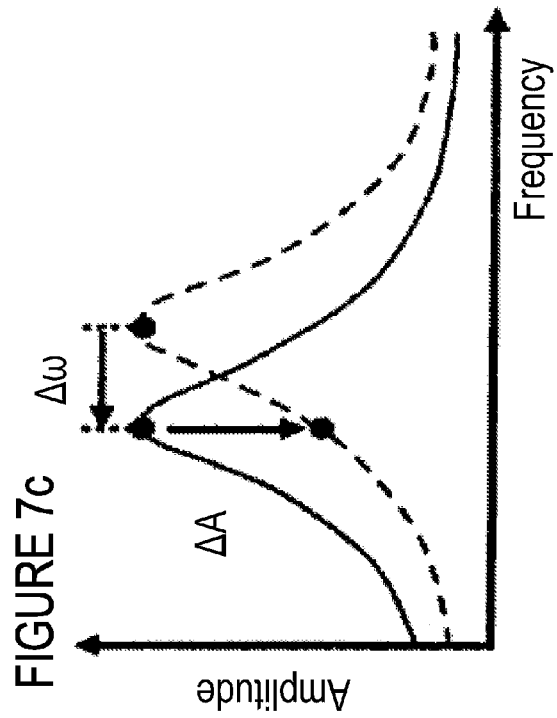

Piezoelectric coupling between electrical and mechanical phenomena is extremely common in inorganic materials (20 out of 32 symmetry groups are piezoelectric)[13] and is nearly universal in biopolymers such as proteins and polysaccharides.[14] In the last decade, Piezoresponse Force Microscopy (PFM) has emerged as a key tool for electromechanical imaging, polarization control, and local spectroscopic measurements in ferroelectric materials on the nanoscale.[15,16,17] To date, the vast majority of PFM studies has been performed on ferroelectric materials with relatively strong (d~20-2000 pm/V) piezoelectric coefficients. However, PFM Imaging and spectroscopy of domain dynamics at small excitation voltages and imaging of weak (d~1-10 pm/V) piezoelectric materials such as 111-V nitrides[18] and biopolymers[19] necessitate the amplification of the response signal compared to the amplitude of surface oscillations. A number of groups have suggested to increase detection limits in PFM and decrease modulation voltages by imaging at frequencies corresponding to the contact resonances of the cantilever.[20,21,22] However, the contact resonances are extremely sensitive to the contact stiffness of the tip-surface junction due to surface curvature and variation in local mechanical properties,[23] as illustrated in FIGS. 7a-7c. This effect is particularly pronounced for topographic inhomogeneities on the length scale of contact radius such as step edges, etc., which can be erroneously interpreted as PFM contrast. FIG. 7a shows how contact stiffness depends strongly on surface topography through the variation of contact area and local mechanical properties. FIG. 7b shows how the amplitude at a constant frequency provides information on electrochemical activity on a homogeneous surface. In contrast, FIG. 7c shows how on inhomogeneous surfaces, changes in contact resonant frequency can result in strong variations in the signal, even on piezoelectrically uniform surfaces.

Here, we analyze the mechanisms for resonance enhancement in PFM and develop an approach for local electromechanical imaging based on the rapid (10-100 ms/pixel) measurement of the amplitude vs. frequency response curve at each point. This technique allows mapping of local electromechanical activity, contact resonant frequency, and Q-factor, thereby deconvoluting the mechanical and electromechanical effects. Resonance-enhanced PFM measurements are demonstrated on polycrystalline lead titanate-zirconate (PZT) ceramics.

A detailed analysis of cantilever dynamics in PFM[24] shows that the PFM signal is a linear combination of local and non-localelectrostatic and local electromechanical contributions. The resonant frequencies are determined only by the weakly voltage dependent mechanical properties of the system and are independent of the relative contributions of the electrostatic and electromechanical interactions. As shown by Sader,[25] in the vicinity of the resonance for small damping (Q>10), the amplitude-frequency response can be described using the harmonic oscillator model to yield[26]

$$A_i(\omega) = \frac{A_i^{max}\omega_{i0}^2/Q_i}{\sqrt{(\omega_{i0}^2 - \omega^2)^2 + (\omega\omega_{io}/Q_i)^2}} \quad (1)$$

where $A_1^{max}$ is the signal at the frequency of $I^{th}$ resonance $\omega_{io}=Q_i$ is the quality factor that describes energy losses in the system. The frequencies at which the system is most sensitive to crosstalk occurs not at the resonance peak, but at the frequencies to either side of the peak, $\omega_{im}^{\pm}$, where the slope of the $A(\omega)$ curve is greatest. By using $(\omega_{io} \pm \omega_m^-)/\omega_{io}-0.35/Q_i$, the change in amplitude due to a shift in the resonant frequency is given by:[27]

$$\delta A_i = \frac{4}{\sqrt[3]{3}} \frac{Q_i}{\omega_{io}} A_i^{max} \delta\omega_{io} \quad (2)$$

Variations in the contact resonant frequency, $\delta\omega_{10}$, due to the change in tip-surface contact stiffness can be obtained using analysis by Mirman et at. The resonant frequencies of the cantilever are $\omega_i^2=EI\mu^4/mL,^4=\mu^4_ik/3$ mL, where E is the Young's modulus of the cantilever material, I is the $2^{nd}$ moment of inertia of the cross-section, and m is mass per unit length. The dimensionless wave number, $\mu$, is related to the cantilever spring constant, k=3E/3IL$^3$, and tip-surface contact stiffness, $k_1$, as $$\mu_i = \frac{a_i + b_i\gamma_1}{1 + c_i\gamma_1} \quad (3)$$

where $y_1=k_1/k$ and coefficients ai, bi, and ci for i-th resonance are given in Table 1.

From Eqs. (2,3), the variation in the resonance-enhanced PFM signal due to variations in the surface topography or local elastic properties is $$\delta A_i = \frac{S}{3\sqrt{3}} Q_i A_i^{max} \frac{b_i - a_i c_i}{(1 + c_i\gamma_1)(a_i - b_i\gamma_1)} \delta\gamma_1. \quad (4)$$

| Resonance | $a_1$ | $b_1$ | $c_1$ | $d_1$ | $f_1$ | $\gamma_i$ |
|---|---|---|---|---|---|---|
| 1 | 1.88 | 0.708 | 0.180 | 0.345 | 5.10 | 3.83 |
| 2 | 4.69 | 0.145 | 0.0207 | 0.0630 | 98.7 | 39.7 |
| 3 | 7.85 | 0.0564 | 0.00555 | 0.0242 | 605 | 158 |
| n | $\pi\left(n - \frac{1}{2}\right)$ | $\frac{4.8}{\pi^2 n^2}\left(1 + \frac{1}{4n}\right)$ | $\frac{4.8}{\pi^3 n^3}$ | $\frac{1.6}{\pi^3 n^3}(4n + 1)$ | $\frac{\pi^3 n^3}{7.2}(2n - 1)$ | $\frac{\pi^3 n^3}{4.8}\left(1 - \frac{3}{8n}\right)$ |

Robust PFM imaging requires that changes in the signal due to shifts in the resonant max frequency, $\delta A$, is small compared to the PFM signal, i.e. $\delta A_i < \forall A_i^{max}$, where constant a can be selected as $\forall$=0.1 or below, corresponding to an elastic cross-talk with the PFM signals of 10% or below. The conditions for the variation in spring constant can then be obtained from Eq. (4) in a straightforward manner. In particular, for high contact stiffnesses ($y_1 \gg 1$) the condition for robust electromechanical imaging is $\delta\gamma_1 < 3\sqrt{3\alpha\gamma_{11}}^2 d_i/(\delta Q)$, where the constant $d_i = b_i c_i/(b_i - a_i c_i)$ is listed in Table 1. Under typical PFM imaging conditions, k=4 N/m, k1=1000 N/m, and Q=20, the condition is $\delta k_1/k_1 < 0.27$ for the first resonance and $\delta k_1/k_1 < 0.052$ for the second. Note that while for the first resonance, a 10% variation in the contact stiffness will not result in a significant topographic cross-talk. However, this is no longer true for second and higher-order resonances.

For soft contact ($\gamma_1 \ll 1$), corresponding to stiff cantilevers or high frequencies at which inertial stiffening effects become important, the condition for robust electromechanical imaging is $\delta\gamma_1 < 3\sqrt{3\alpha\gamma_{11}}^2 d_i/(\delta Q)$, where constants are $f_i = \alpha_i/(b_i - a_i c_i)$ listed in Table 1. The cross-over between these regimes occurs for $\gamma_{1c} = \sqrt{\alpha_i(b_i c_i)}$, as listed in Table 1. For the parameters above, this corresponds to $i \geq 4$ and the condition for robust imaging is $\delta k_i/k_i < 0.005$ for the 4th reasonance and $\delta k_i/k < 0.005$ for the $5^{th}$ resonance. Note however that under such conditions, transduction of the displacement from the surface to the tip would be reduced.[24]

From this analysis, it is clear that even small variations in elastic or topographic conditions at the surface will result in strong cross-talk in resonance-enhanced PFM. Practically, resonance enhancement using a constant excitation frequency for PFM can be used reliably only when imaging anti-parallel ferroelectric domains on topographically uniform surface, i.e. when elastic properties are uniform.

Successful resonance-enhanced PFM imaging on topographically or elastically inhomogeneous materials thus requires continuous tracking of the local contact resonant frequency. However, traditional phase-locked loop based frequency-tracking schemes are sensitive to the phase of the signal, as shown in FIG. 7d. The phase of the response is opposite for antiparallel domains and changes by 180° across the resonance. However, due to the 180° phase change in the response with respect to the driving signal between antiparallel domains, the feedback loop becomes unstable for domains of certain polarity. Moreover, the measured response at the resonant frequency depends on both the local electromechanical activity and Q-factor. Hence, local losses can not be determined unambiguously from the maximal signal strength as is the case for Atomic Force Acoustic Microscopy since[28] Q-factor and piezoelectric activity can vary independently. Thus, we have developed an approach for resonance-enhanced PFM based on the acquisition of an amplitude-frequency curve at each point.

Figure 8A:
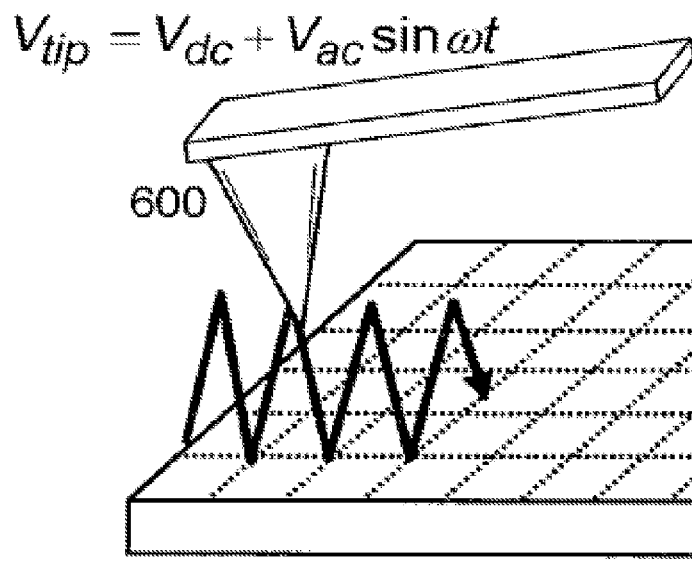
FIGS. 8a-8c show PFM measurements with resonance enhancement and resonance spectra at selected locations within the domains and at the domain wall of a sample, representing an embodiment of the invention.
Figure 8B:
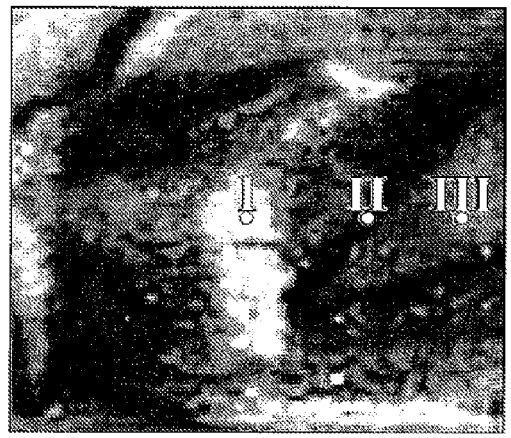
Figure 8C:
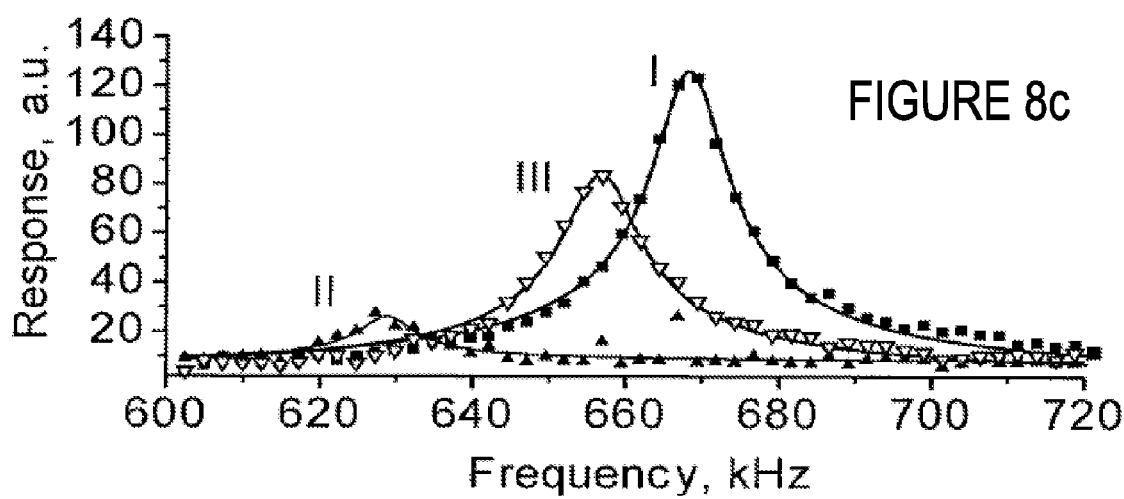

PFM and R-PFM are implemented on a commercial Scanning Probe Microscopy (SPM) system (Veeco Multi-Mode NS-IIIA) equipped with additional function generators. A custom-built, shielded sample holder was used to bias the tip directly thus avoiding cross-talk with the SPM electronics. Measurements were performed using Au coated tips (NSC-36 B, Micromasch, resonant frequency-155 kHz, spring constant k~1.75 N/m). To implement R-PFM, the microscope was configured in a manner similar to the force volume mode, shown in FIG. 6a (experimental set-up for PFM measurements with resonance enhancement). The tip approaches the surface vertically in contact mode until the deflection set-point is achieved. The amplitude-frequency data is then acquired at each point. After acquisition, the tip is moved to the next location and continued until a mesh of evenly spaced M×N points is acquired. The A($\omega$) curves are collected at each point as a 30 data array, with the typical acquisition time of 10-100 ms per point. The data is fitted to Eq. (1) to yield coefficients giving the local electromechanical response $A_i^{max}$, resonant frequency $\omega_{i,o}$, and Q-factor. These coefficients are then plotted as 2D maps. An example of a PFM image and A($\omega$) curves at three different locations is shown in FIGS. 8b and 8c, respectively. FIG. 8b shows a map of the resonant PFM max amplitude signal $A_i^{max}$ across a PZT surface. FIG. 8c shows the response spectra and fits using Eq. (1) at selected locations within the domains and at the domain wall. Note that the variation in the local resonant frequency between dissimilar domains is on the order of 10-30 kHz—an amount significantly exceeding the width of the resonance peak, and that the position of the resonance peak is significantly shifted and its magnitude is reduced at the domain wall.

Resonance-enhanced PFM images of polycrystalline PZT are shown in FIGS. 9a-9g. The topographic image in FIG. 9a shows topographic changes at the grain boundary and features associated with preferential domain etching. The PFM amplitude and phase images at 2.0 MHz, i.e. far from the resonance, detail the focal domain structure. Note in FIG. 9b, (1) the strong enhancement of the PFM signal at the grain boundary, (11) the presence of 180° domain walls within the grains, and (111) the region with zero response corresponding to an in-plane domain or embedded non-ferroelectric particle. FIGS. 9c and 9d show a map of where convergence of the fitting procedure was successful (white) and unsuccessful (black). Unsuccessful convergence occurs where the response signal is too weak (e.g. region 11 of FIG. 9b) and no resonance peak max is detectable. The maximal electromechanical response $A_i^{max}$ activity map at the local resonance frequency in FIG. 9e illustrates variations in the piezoelectric response between the domains. Note that there is no significant enhancement of the response at the grain boundary, while there is a significant 150 kHz shift in the local resonant frequency as shown in FIG. 9f. Finally, a map of the Q-factor in FIG. 9g illustrates that losses are almost uniform throughout the sample. It is important to note that there are significant variations between these images, thus signifying that they provide complementary data about the local material properties. It is also important to note the good agreement between FIG. 9b and FIG. 9e, which is indicative of the veracity of the electromechanical data.

To summarize, we have shown how to analyze the contrast formation mechanism in resonance-enhanced PFM. It is shown that even small variations in topography or local elastic properties result in significant cross-talk in the PFM signal, hence limiting the constant frequency resonance enhanced mode to the special case of antiparallel domains on topographically uniform surface. The resonance-enhanced PFM developed by the method of the invention allows real-space mapping of electromechanical activity, contact resonant frequency, and Q-factor, thus providing comprehensive information on the local mechanical and electromechanical properties and avoiding the limitations of traditional PLL-based frequency tracking feedback schemes. This approach will pave the way for future high resolution studies of electromechanical activity in weakly piezoelectric materials and inelastic processes associated with domain nucleation and domain wall motion in ferroelectrics.

Example 3

Imaging Mechanical Properties

Example 3 details the application of static band-excitation principle to Atomic Force Acoustic Microscopy. Here, the band excitation set-up is used to image mechanical properties. The electrical bias applied to the tip induces electrostatic interactions between the tip and the substrate. These electrostatic interactions drive the cantilever. The dynamic response of the cantilever is determined in part by the mechanical stiffness of the tip surface junction. Therefore variations in the position, height, and width of the peak of the amplitude-frequency response curve are directly related to variations in hardness across the substrate surface.

Figure 10A:
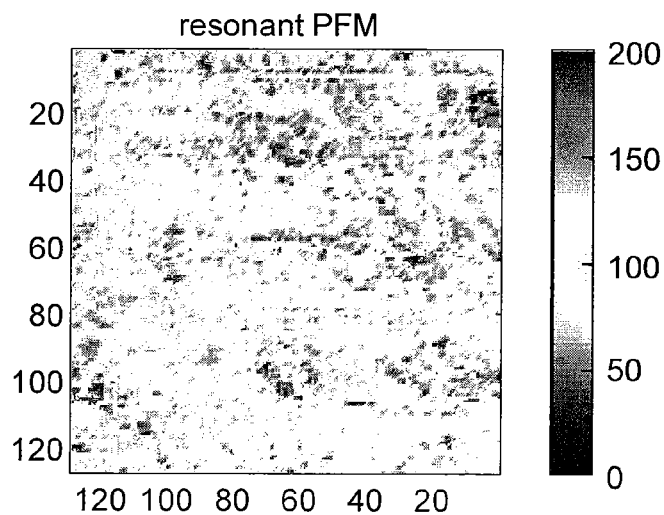
FIGS. 10a-10c show images generated by point-by-point band excitation scans, representing an embodiment of the invention.
Figure 10B:
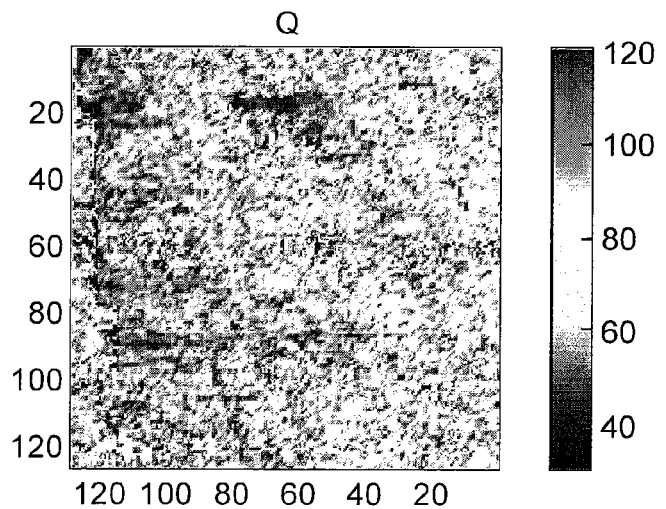
Figure 10C:
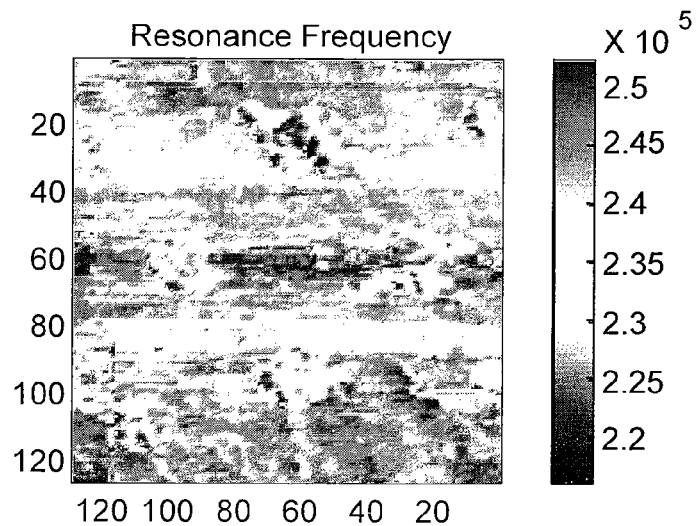
Figure 11A:
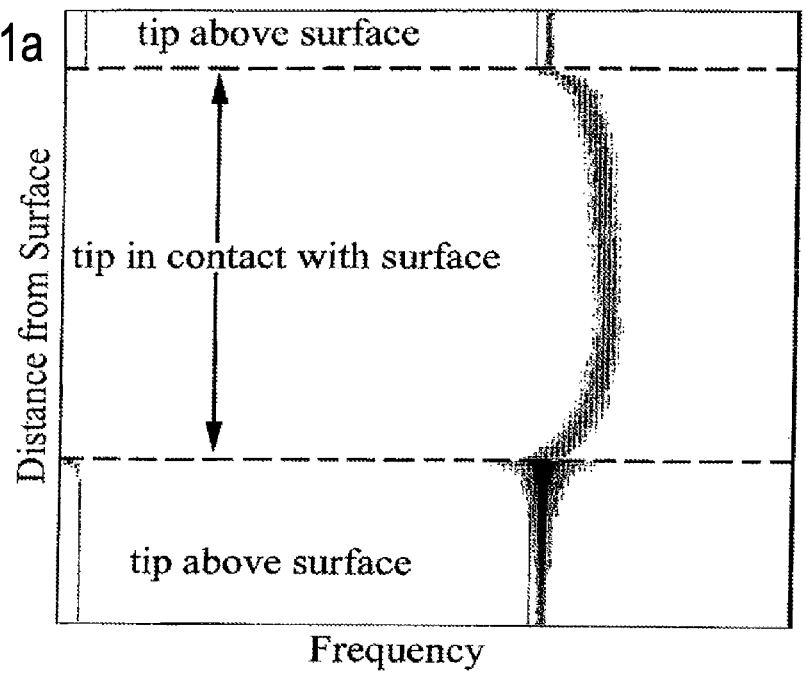
FIGS. 11a-11d show the time evolution of the resonance structure of the cantilever on approaching and then withdrawing from the surface (2D graph); also shown are time dependences of amplitude, resonant frequency, and Q-factor extracted from this data (the acquisition time is ~100 s), representing an embodiment of the invention.
Figure 11B:
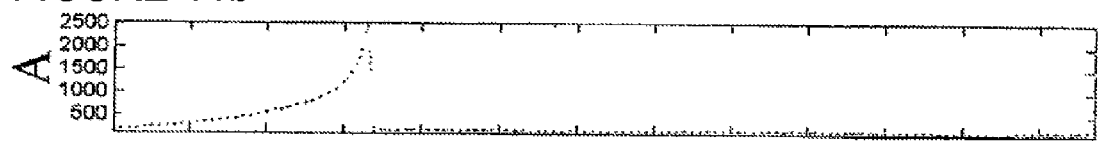
Figure 11C:
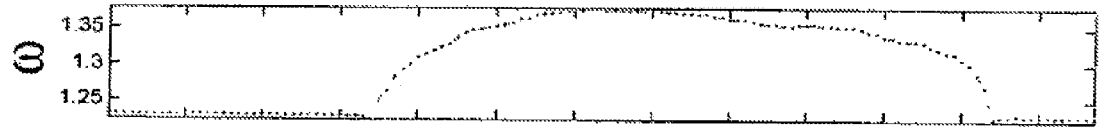
Figure 11D:
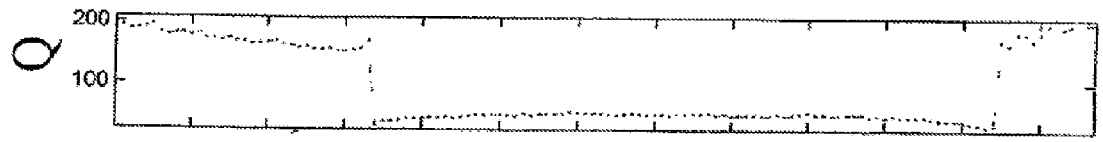

The results shown in FIG. 10a-10c were obtained by a point-by-point band excitation scan of a non-piezoelectric inter-metallic alloy (NiAlMo). This sample contains inclusions of a softer alloy within a harder matrix. The resonance frequency map shows the location of the softer inclusions as regions with a lower resonant frequency (blue) within the harder matrix. In this case, the band excitation signal was sent directly to the tip. However, it is possible (and perhaps even advantageous) to send this same signal to a piezoelectric acoustic stage below the sample for operation in band excitation AFAM.

Example 4

Dissipation-Distance Curve

Example 4 details the application of static band-excitation principle to Force-distance measurements. Here, the band excitation set-up is used to detect the changes in cantilever response as a function of tip surface separation. The electrical bias applied to the tip induces electrostatic interactions between the tip and the substrate. These electrostatic interactions drive the cantilever. The dynamic response of the cantilever is determined in part by the mechanical stiffness of the system, which is the sum of cantilever stiffness and the stiffness of tip surface junction. The data in FIG. 11 illustrates the change in the resonance spectrum of the system on approaching the surface (signal increases due to increase in capacitive forces), on contact (signal decreases due to increase in tip-surface junction), and on retraction of tip from the surfaces. Note the significant change of the resonant structure from free to surface-bound cantilever. The corresponding forces, Q-factors, and resonant frequencies are plotted in FIGS. 11b, 11c and 11d and are extracted from data in FIG. 11a using simple harmonic oscillator fit.

The 4 examples illustrated should not be construed as the only suitable embodiments of the invention. The present invention can be applied to any scanning probe microscopy apparatus or methods, including, but not limited to atomic force microscopy (AFM), electrostatic force microscopy (EFM), force modulation microscopy (FMM), kelvin probe force microscopy (KPFM), magnetic force microscopy (MFM), magnetic dissipation force microscopy, magnetic resonance force microscopy (MRFM), near-field scanning optical microscopy (NSOM), scanning near-field optical microscopy (SNOM), photon scanning tunneling microscopy (PSTM), scanning electrochemical microscopy (SECM), scanning capacitance microscopy (SCM), scanning gate microscopy (SGM), scanning thermal microscopy (SThM), scanning tunneling microscopy (STM), and scanning voltage microscopy (SVM), as well as other embodiments of scanning probe methods. This BE method is also applicable to micro- and nanomechanical systems, including cantilever sensors, membrane sensors, etc. Finally, current flowing from tip to the surface can be measured in a similar fashion.

DEFINITIONS

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency is intended to mean frequencies less than or equal to approximately 300 GHz as well as the infrared spectrum.

The term substantially is intended to mean largely but not necessarily wholly that which is within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience.

The term plurality is intended to mean two or more than two. The term any is intended to mean all applicable members of a set or t least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub) method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skin in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are appended claims and their equivalents cover all such substitutions, modifications, additions and/or rearrangements. The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

The invention claimed is:

1. A method, comprising:
generating a band excitation signal;
simultaneously exciting a probe at a plurality of frequencies within a predetermined frequency band based on the band excitation signal;
scanning a sample held in an apparatus to measure a response of the probe across a subset of frequencies of the predetermined frequency band;
separately extracting, by a processor of a relevant dynamic parameter extractor, resonant frequency, maximum amplitude, and Q factor parameters associated with each position crossed during the scan; and
adjusting the band excitation signal based on the extracting.

2. The method of claim 1, further comprising performing a mathematical transform on the measured response of the probe and outputting an amplitude-frequency data and phase-frequency data at each scanned position of the sample.

3. The method of claim 2, wherein the mathematical transform is selected from the group consisting of an integral transform and a discrete transform.

4. The method of claim 2, wherein the relevant dynamic parameter extractor extracts the resonant frequency, the maximum amplitude, and the Q factor parameters for each position of the sample based on an analysis of the amplitude frequency data and the phase-frequency data.

5. The method of claim 1, wherein the relevant dynamic parameter extractor extracts the resonant frequency, the maximum amplitude, and the Q factor parameters independently for each position.

6. The method of claim 1, wherein the subset of frequencies of the predetermined frequency band includes a selected frequency and associated resonance frequencies.

7. The method of claim 1, wherein the subset of frequencies is substantially the same as the predetermined frequency band.

8. The method of claim 1, wherein the band excitation signal includes a controlled amplitude and phase density within the predetermined frequency band.

9. The method of claim 1, wherein the adjusting the band excitation signal is based on the extracted resonant frequency, maximum amplitude, and Q factor parameters.

* * * * *